United States Patent
Miklós et al.

(10) Patent No.: US 11,382,175 B2
(45) Date of Patent: Jul. 5, 2022

(54) METHOD FOR PROVIDING A BREAKOUT PDU SESSION FOR LOCAL IP ACCESS

(71) Applicant: Telefonaktiebolaget LM Ericsson (publ), Stockholm (SE)

(72) Inventors: György Miklós, Pilisborosjenö (HU); János Farkas, Kecskemét (HU); Göran Rune, Linköping (SE); Balázs Varga, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/967,228

(22) PCT Filed: Feb. 15, 2018

(86) PCT No.: PCT/IB2018/050944
§ 371 (c)(1),
(2) Date: Aug. 4, 2020

(87) PCT Pub. No.: WO2019/158973
PCT Pub. Date: Aug. 22, 2019

(65) Prior Publication Data
US 2021/0084713 A1    Mar. 18, 2021

(51) Int. Cl.
*H04W 88/16* (2009.01)
*H04W 36/12* (2009.01)
(Continued)

(52) U.S. Cl.
CPC .......... *H04W 88/16* (2013.01); *H04W 8/082* (2013.01); *H04W 36/12* (2013.01); *H04W 76/12* (2018.02); *H04W 92/045* (2013.01)

(58) Field of Classification Search
None
See application file for complete search history.

(56) References Cited

U.S. PATENT DOCUMENTS

| 9,179,288 B2 | 11/2015 | Kim et al. |
| 2011/0134837 A1* | 6/2011 | Wang .................. H04L 63/0892 370/328 |

(Continued)

FOREIGN PATENT DOCUMENTS

WO    WO 2010/123643 A1    10/2010

OTHER PUBLICATIONS

International Search Report and Written Opinion of the International Searching Authority, PCT/IP2018/050944, dated Oct. 30, 2018, 10 pages.

(Continued)

*Primary Examiner* — San Htun
(74) *Attorney, Agent, or Firm* — Sage Patent Group

(57) ABSTRACT

A method may be provided to operate a core network entity of a wireless communication network. A session establishment request may be received from a wireless terminal through a base station node. Responsive to receiving the session establishment request, the core network entity may determine that a breakout protocol data unit session is to be established for the wireless terminal. Responsive to determining that the breakout PDU session is to be established for the wireless terminal, a request may be transmitted to the base station node, and the request may include an indication that the breakout PDU session is to be established for the wireless terminal. Related methods may be provided for base station nodes, wireless terminals, and central controllers.

20 Claims, 19 Drawing Sheets

(51) Int. Cl.
  *H04W 76/12* (2018.01)
  *H04W 8/08* (2009.01)
  *H04W 92/04* (2009.01)

(56) References Cited

U.S. PATENT DOCUMENTS

| | | | |
|---|---|---|---|
| 2013/0121159 A1* | 5/2013 | Anthony, Jr. | H04W 28/02 370/328 |
| 2015/0063091 A1* | 3/2015 | Vesterinen | H04W 8/02 370/216 |
| 2018/0270781 A1* | 9/2018 | Baek | H04W 60/06 |
| 2018/0270888 A1* | 9/2018 | Faccin | H04W 76/15 |
| 2018/0324646 A1* | 11/2018 | Lee | H04W 36/0016 |
| 2018/0324663 A1* | 11/2018 | Park | H04W 36/0069 |
| 2018/0376384 A1* | 12/2018 | Youn | H04W 36/0022 |
| 2019/0109721 A1* | 4/2019 | Qiao | H04L 47/24 |
| 2020/0275331 A1* | 8/2020 | Kim | H04W 36/00 |

OTHER PUBLICATIONS

Nokia et al: Local Breakout to support Ultra-Low Latency Communications, 3GPP Draft; R3-162314 Local Breakout, 3GPP TSG-RAN WG3 Meeting #93bis Sophia Antipolis, France, Oct. 10-14, 2016, XP051151965, R3-162314, 6 pages.

Ericsson; "Further Comparing Stand-Alone and Co-Located SIPTO for V2x", 3GPP TSG-RAN WG3 Meeting #92, Nanjing, China, May 23-27, 2016, R3-161305, XP51106105A, 4 pages.

China Mobile; Solution for Enabling (re)selection of efficient user plane paths, SA WG2 Meeting #113AH, Feb. 23-26, 2016, Sophia Antipolis, France, S2-160956, XP51077948A, 4 pages.

3rd Generation Partnership Project Technical Specification Group Services and System Aspects; System Architecture for the 5G System; Stage 2 (Release 15), 3GPP TS 23.501 V15.0.0 (Dec. 2017), 181 pages.

3rd Generation Partnership Project; Technical Specification Group Services and System Aspects; Procedures for the 5G System; Stage 2 (Release 15), 3GPP TS 23.502 V15.0.0 (Dec. 2017), 258 pages.

3rd Generation Partnership Project; Technical Specification Group Services and System Aspects; General Packet Radio Service (GPRS) enhancements for Evolved Universal Terrestrial Radio Access Network (E-UTRAN) access, (Release 15), 3GPP TS 23.401 V15.2.0 (Dec. 2017), 404 pages.

IEEE 802.1, Time-Sensitive Networking Task Group, Retrieved from: http://www.ieee802.org/1/pages/tsn.html, Jan. 16, 2018, 4 pages, Best Available Date: May 3, 2017.

IETF DetNet Working Group, Deterministic Networking (detnet), Retrieved from: https://datatracker.ietf.org/wg/detnet/about/, Jan. 16, 2018, 5 pages.

\* cited by examiner

Figure 11
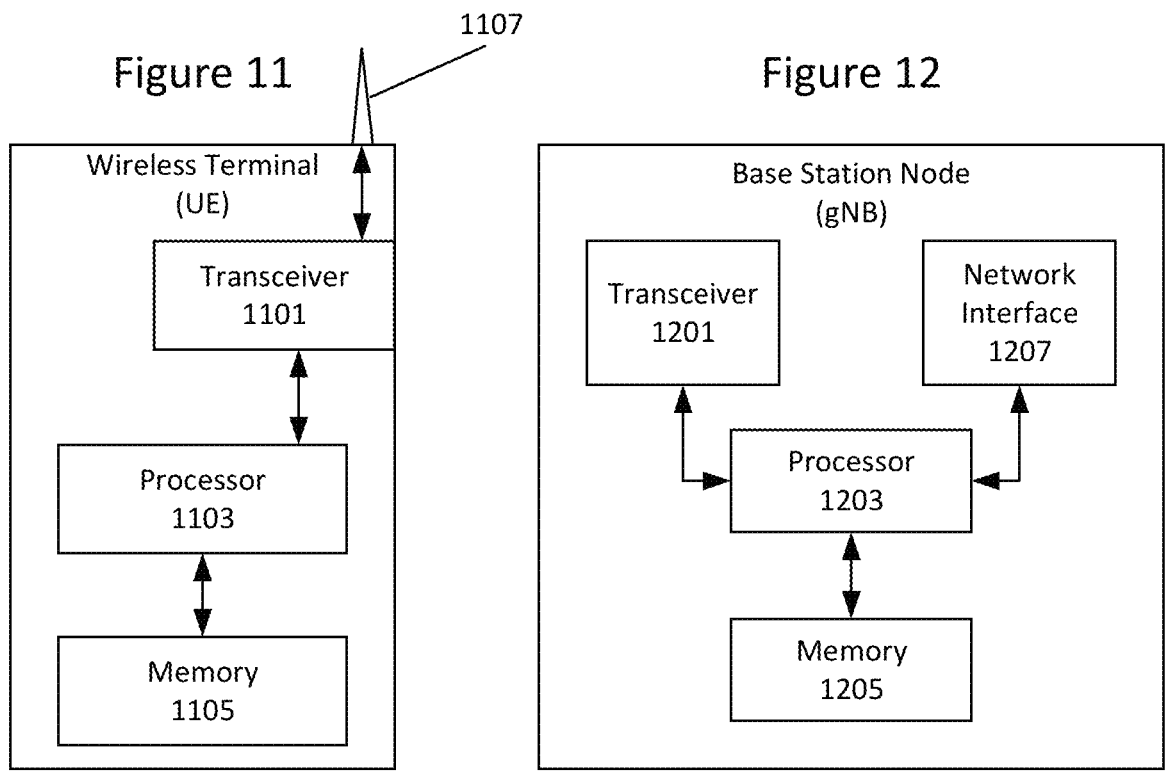
Figure 12
Figure 13
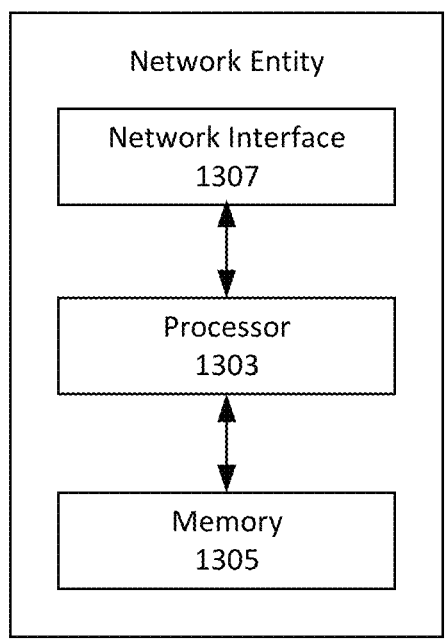
Figure 14
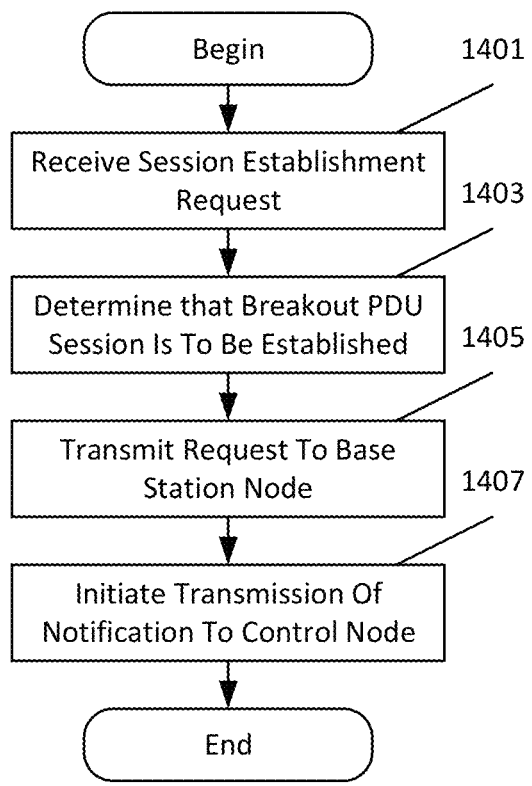

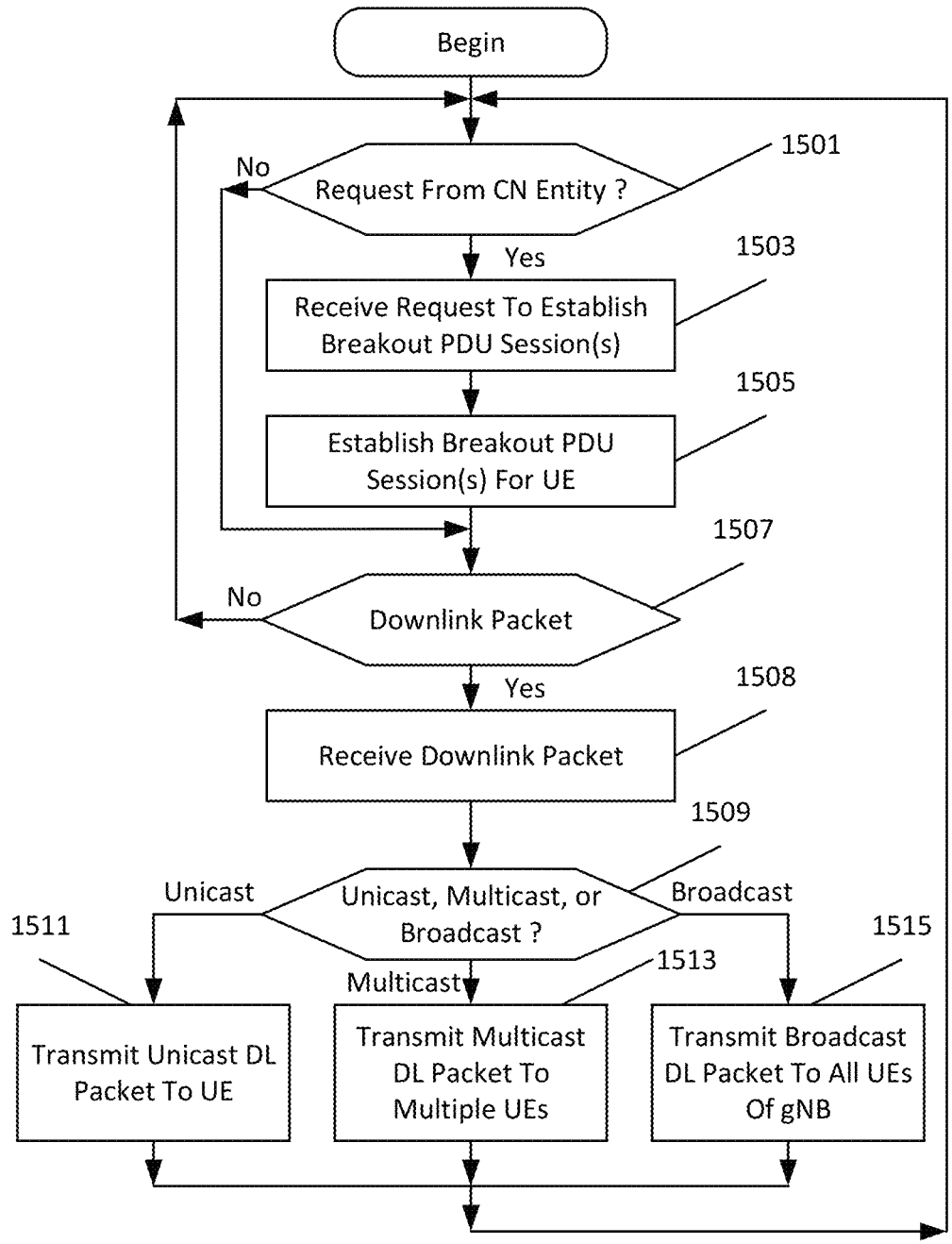

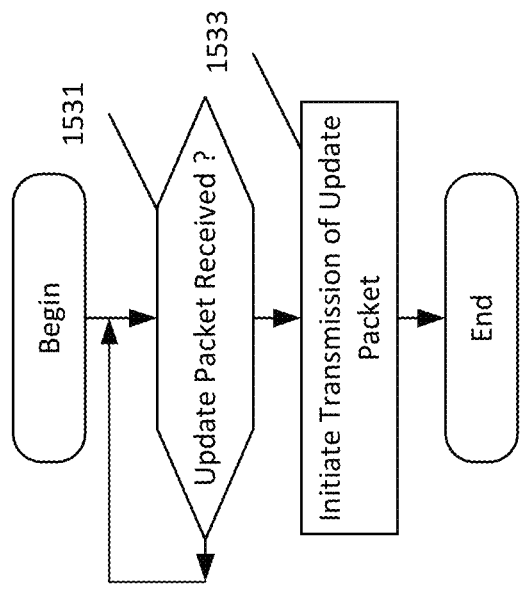
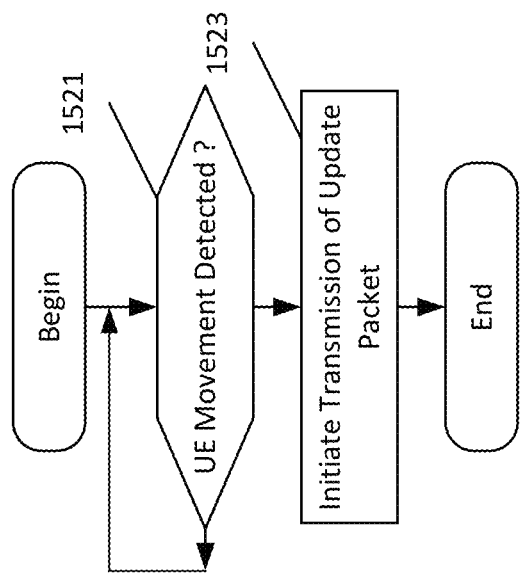
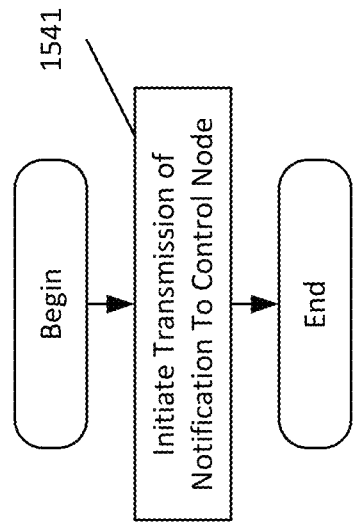

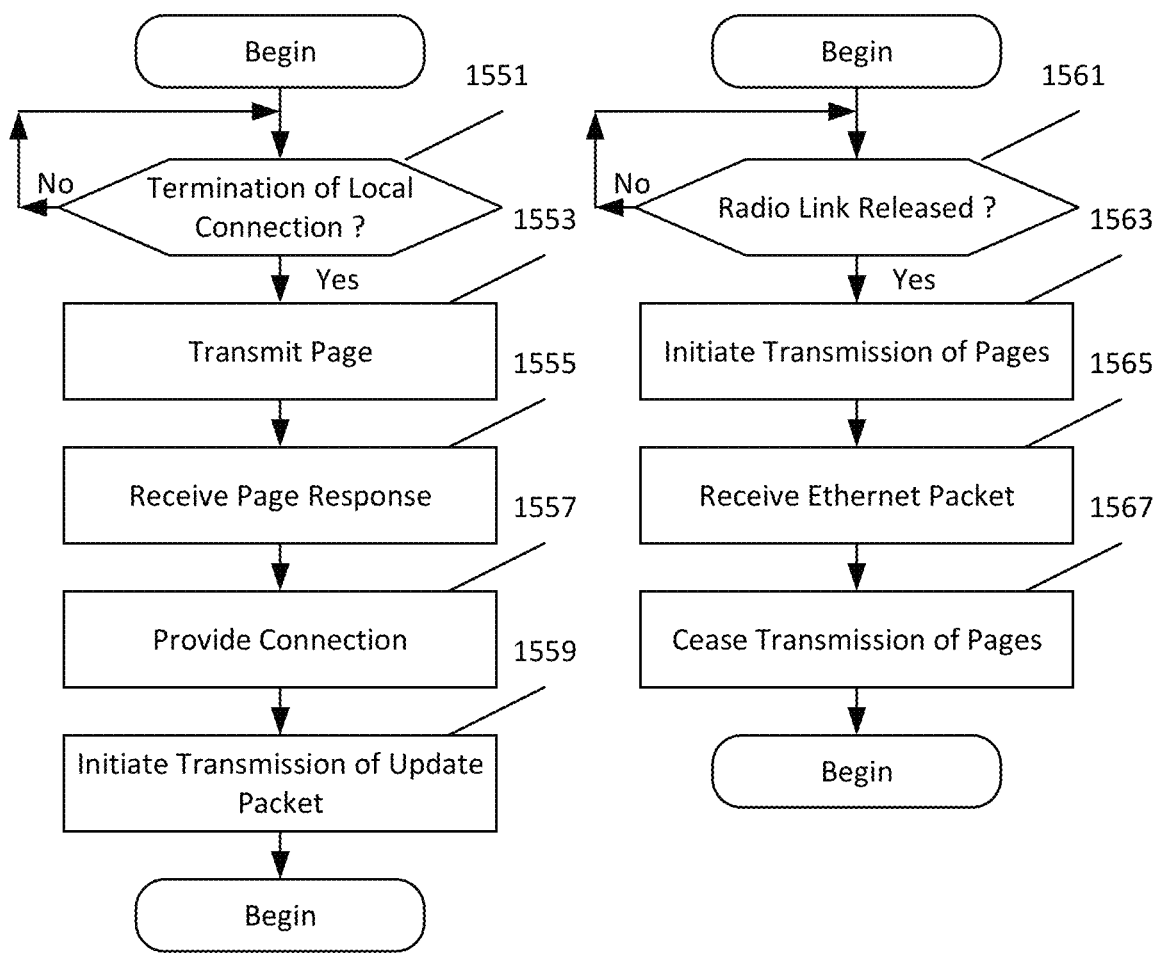

METHOD FOR PROVIDING A BREAKOUT PDU SESSION FOR LOCAL IP ACCESS

CROSS REFERENCE TO RELATED APPLICATIONS

This application is a 35 U.S.C. § 371 national stage application of PCT International Application No. PCT/IB2018/050944 filed on Feb. 15, 2018, the disclosure and content of which are incorporated by reference herein in their entirety.

TECHNICAL FIELD

The present disclosure related generally to communications, and more particularly, to methods providing communication sessions and related network entities.

BACKGROUND

Fifth generation (5G) mobile technologies (e.g., 5G) are discussed, for example, in: 3GPP TS 23.501, v15.0.0, 2017-12, System Architecture for the 5G System, Stage 2, Release 15 (also referred to as reference [3]); and 3GPP TS 23.502, v15.0.0, 2017-12, Procedures for the 5G System, Stage 2, Release 15 (also referred to as reference [4]). Such $5^{th}$ generation technologies are positioned to provide a wider range of services than existing 3G/4G technologies. 5G technology is expected to enable a fully connected society, in which a rich set of Use Cases (some of which are still not yet conceptualized) will be supported from the Enhanced Mobile Broadband through media distribution, e.g., Massive Machine Type of Communication (M-MTC) to the Mission Critical Services (Critical Machine Type of Communication—C-MTC).

In this wide range of applications, localized network deployments may play an increasingly important part. Examples may include enterprise networks, factory automation use cases, etc. Localized network deployments may refer to network deployments which are geographically limited, or alternatively to deployments which cover a wide geographical area but are limited in a number of communication entities. One specific use case for local network deployments may include C-MTC services.

C-MTC services may cover a big set of applications, but most of these applications may be characterized by low latency and high reliability. Although low latency may be an important criterion in numerous Use Cases, high reliability is expected to be a basic requirement in a wider range of services. For example, low latency and high reliability may be important factors, for example, in Industry (Factory) Automation Use Cases (e.g., high speed motion control, packaging, printing, etc.), and several special subtasks of Smart Grid service. In the above Use Cases, the guarantees on latency and reliability requirements may together guarantee sufficient service quality.

The TSN (Time-Sensitive Networking) Task Group of IEEE 802.1 (also referred to as Reference [1]) provides a standardized approach to satisfy low latency and high reliability requirements in fixed Ethernet networks. The IETF DetNet Working Group (also referred to as Reference [2]) extends the approach to layer 3 networks. These standards may also be applied with 5G mobile networks, and are expected to help proliferation of C-MTC deployments.

To support low delay and high reliability, system procedures should be adjusted accordingly. Every user plane hop that is unnecessarily part of the user plane path may unnecessarily add to user plane latency and may reduce system reliability by adding potential points of failure. Likewise, control plane signaling that is unnecessarily executed may add to latency of system procedures, and may add complexity which may lead to potential failures and costs that hinder proliferation of the technology.

Local IP Access (LIPA) is discussed in section 4.3.16 of 3GPP TS 23.401, v15.2.0, 2017-12, General Packet Radio Service (GPRS) enhancements for Evolved Universal Terrestrial Radio Access Network (E-UTRAN) access, Release 15 (also referred to as Reference [5]). The LIPA function may enable an IP capable UE connected via a HeNB to access other IP capable entities in the same residential/enterprise IP network without the user plane traversing the mobile operator's network, except the HeNB subsystem. The Local IP Access is achieved using a Local Gateway GW (L-GW) collocated with the HeNB.

International Publication No. WO/2012/137044 entitled "Ethernet Based Local IP Access" (also referred to as Reference [6]) describes an approach to Local IP Access in an enterprise network with mobility support. The SGW function may be located in the operator core network, while the LGW (Local GW) functionality may be co-located with the HeNB. Mobility may be provided using L2 addressing. The UE's IP address is mapped to a MAC (i.e., L2) address at its current H(e)NB-LGW node.

A single protocol data unit PDU session with multiple PDU session anchors is discussed in section 5.6.4 of Reference [3]. In order to support traffic offloading, the Session Management Function (SMF) may control the data path of a PDU session so that the PDU session may simultaneously correspond to multiple N6 interfaces. The user plane function UPF that terminates each of these interfaces is said to support a PDU session anchor functionality. Each PDU session anchor supporting a PDU session provides a different access to the same DN. One of the UPFs may be located close to (or co-located with) the RAN node, so that the system supports local offloading of data.

Accordingly, there continues to exist demand for methods and systems providing reduced latency, increased reliability, reduced complexity, and/or reduced cost.

SUMMARY

According to some embodiments of inventive concepts, a method may be provided to operate a core network entity of a wireless communication network. A session establishment request may be received from a wireless terminal through a base station node. Responsive to receiving the session establishment request, the core network entity may determine that a breakout protocol data unit session is to be established for the wireless terminal. Responsive to determining that the breakout PDU session is to be established for the wireless terminal, a request may be transmitted to the base station node, and the request may include an indication that the breakout PDU session is to be established for the wireless terminal.

According to some other embodiments of inventive concepts, a method may be provided to operate a base station node of a wireless communication network. A request may be received from a core network entity of a wireless communication network, and the request may include an indication that that a breakout PDU session is to be established for a wireless terminal and a user plane address for the breakout PDU session for the wireless terminal. A downlink packet may be received at the base station node over a local area network, and the downlink packet may include the user plane address. Responsive to the user plane address of the downlink packet matching the user plane address for the breakout PDU session for the wireless terminal, the downlink packet may be transmitted over a radio interface to the wireless terminal in accordance with the breakout PDU session.

According to still other embodiments of inventive concepts, a method may be provided to operate a wireless terminal in a wireless communication network. An update packet may be transmitted over a radio interface to a base station node of a wireless communication network, and the update packet may include a user plane address for the wireless terminal. A downlink packet may be received over the radio interface from the base station node, and the downlink packet may include the user plane address.

According to yet other embodiments of inventive concepts, a method may be provided to operate a central controller coupled with a plurality of nodes of a local area network. A notification may be received including a user plane address of a wireless terminal and an identity of a base station node. Responsive to receiving the notification, an update message may be transmitted to a plurality of nodes of a local area network to update respective address tables of the plurality of nodes of the local area network, and the update message may include the user plane address of the wireless terminal and the identity of the base station.

According to some embodiments of inventive concepts, user plane and/or control plane delays may be reduced. Moreover, complexity and/or cost of communication systems may be reduced, and/or reliability may be improved. In addition, Ethernet based systems (e.g., TSN networks) which span both wireless and fixed parts of a network may be more easily supported.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 11 is a block diagram illustrating a wireless terminal according to some embodiments of inventive concepts;

FIG. 12 is a block diagram illustrating a base station node according to some embodiments of inventive concepts;

FIG. 13 is a block diagram illustrating a network entity according to some embodiments of inventive concepts;

FIG. 14 is a flow chart illustrating core network CN entity operations according to some embodiments of inventive concepts;

FIGS. 15A, 15B, 15C, 15D, 15E, and 15F are flow charts illustrating base station node gNB operations according to some embodiments of inventive concepts;

DETAILED DESCRIPTION

Figure 1:
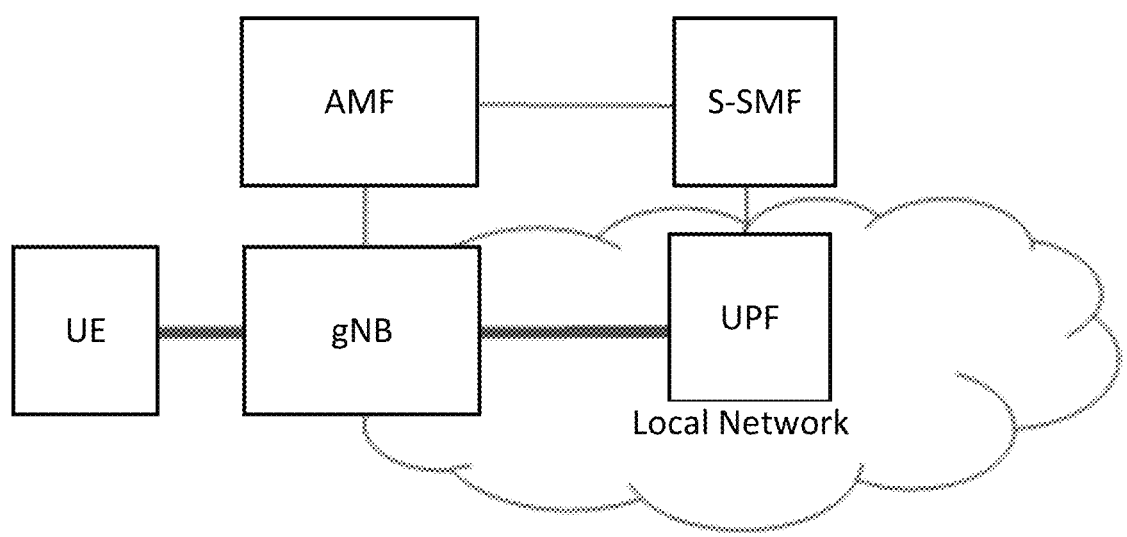
FIG. 1 is a schematic diagram illustrating network elements according to some embodiments of inventive concepts.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

FIG. 11 is a block diagram illustrating elements of a mobile terminal UE (also referred to as a wireless device, a wireless communication device, a wireless terminal, a wireless communication terminal, user equipment, a user equipment node/terminal/device, etc.) configured to provide wireless communication according to embodiments of inventive concepts. As shown, mobile terminal UE may include an antenna 1107, and a transceiver circuit 1101 (also referred to as a transceiver) including a transmitter and a receiver configured to provide uplink and downlink radio communications with a base station node(s) of a radio access network. Mobile terminal UE may also include a processor circuit 1103 (also referred to as a processor) coupled to the transceiver circuit, and a memory circuit 1105 (also referred to as memory) coupled to the processor circuit. The memory circuit 1105 may include computer readable program code that when executed by the processor circuit 1103 causes the processor circuit to perform operations according to embodiments disclosed herein. According to other embodiments, processor circuit 1103 may be defined to include memory so that a separate memory circuit is not required. Mobile terminal UE may also include an interface (such as a user interface) coupled with processor 1103, and/or mobile terminal UE may be incorporated in a vehicle.

As discussed herein, operations of mobile terminal UE may be performed by processor 1103 and/or transceiver 1101. For example, processor 1103 may control transceiver 1101 to transmit communications through transceiver 1101 over a radio interface to a base station node gNB and/or to receive communications through transceiver 1101 from a base station node over a radio interface. Moreover, modules may be stored in memory 1105, and these modules may provide instructions so that when instructions of a module are executed by processor 1103, processor 1103 performs respective operations (e.g., operations discussed below with respect to Example Embodiments).

FIG. 12 is a block diagram illustrating elements of a base station node (also referred to as a network node, base station, eNodeB, eNB, gNodeB, gNB, etc.) of a Radio Access Network (RAN) configured to provide cellular communication according to embodiments of inventive concepts. As shown, the base station node may include a transceiver circuit 1201 (also referred to as a transceiver) including a transmitter and a receiver configured to provide uplink and downlink radio communications with wireless terminals. The base station node may include a network interface circuit 1107 (also referred to as a network interface) configured to provide communications with other nodes (e.g., with other base stations and/or other entities) of the RAN and/or a local area network. The base station node may also include a processor circuit 1203 (also referred to as a processor) coupled to the transceiver circuit, and a memory circuit 1205 (also referred to as memory) coupled to the processor circuit. The memory circuit 1205 may include computer readable program code that when executed by the processor circuit 1203 causes the processor circuit to perform operations according to embodiments disclosed herein. According to other embodiments, processor circuit 1203 may be defined to include memory so that a separate memory circuit is not required.

As discussed herein, operations of the base station node may be performed by processor 1203, network interface 1207, and/or transceiver 1201. For example, processor 1203 may control transceiver 1201 to transmit communications through transceiver 1201 over a radio interface to one or more wireless terminals UEs and/or to receive communications through transceiver 1201 from one or more wireless terminals UEs over a radio interface. Similarly, processor 1203 may control network interface 1207 to transmit communications through network interface 1207 to one or more other network nodes/entities and/or to receive communications through network interface from one or more other network nodes/entities. Moreover, modules may be stored in memory 1205, and these modules may provide instructions so that when instructions of a module are executed by processor 1203, processor 1203 performs respective operations.

FIG. 13 is a block diagram illustrating elements of a network entity (e.g., an AMF entity, an SMF entity, or any other control entity of the radio access network RAN or core network CN) configured to support cellular communication according to embodiments of inventive concepts. As shown, the network entity may include a network interface circuit 1307 (also referred to as a network interface) configured to provide communications with other network entities/nodes (e.g., with a base station node and/or with another network entity of the RAN and/or CN). The network entity may also include a processor circuit 1303 (also referred to as a processor) coupled to the network interface circuit 1307, and a memory circuit 1305 (also referred to as memory) coupled to the processor circuit. The memory circuit 1305 may include computer readable program code that when executed by the processor circuit 1303 causes the processor circuit to perform operations according to embodiments disclosed herein. According to other embodiments, processor circuit 1303 may be defined to include memory so that a separate memory circuit is not required.

As discussed herein, operations of the network entity may be performed by processor 1303 and/or network interface 1307. For example, processor 1303 may control network interface 1307 to transmit communications through network interface 1307 to one or more other network nodes/entities and/or to receive communications through network interface from one or more other network nodes/entities. Moreover, modules may be stored in memory 1305, and these modules may provide instructions so that when instructions of a module are executed by processor 1303, processor 1303 performs respective operations. As noted above, the structure of the network entity of FIG. 13 may be used, for example, to implement an AMF entity, an SMF, and/or a control entity (also referred to as a controller) to perform operations thereof as discussed in greater detail below. Operations of a network entity of FIG. 13, for example, may be performed by one server or distributed across a plurality of network servers having the structure of FIG. 13, and a plurality of such distributed servers may be collectively referred to as a server.

In systems described above, existing system procedures may be maintained with smaller adaptations, and a user plane entity (LGW, UPF) may be located close to or co-located with the RAN entity. However, in case the core network user plane entity is co-located with the RAN entity, existing core network CN control plane procedures to manage the user plane entity may be redundant. Hence, keeping the same CN control plane procedures for the core network user plane may cause unnecessary complexity, leading to added delay, unnecessary costs, and/or potential points of failure, thereby reducing system reliability.

LIPA solutions may not support terminal mobility within the local network. The Single PDU session with multiple PDU session anchors solution may support terminal mobility within the local network, but it does so by maintaining a (local) session anchor in the user plane. That may lead to unnecessary complexity and/or added delay, and may not make use of the fact that a local network (based on e.g., Ethernet technology) could provide local mobility without maintaining a session anchor. (In case a single PDU session with a single local PDU session anchor would be used, a session anchor may also be provided in the user plane.)

Further, the Single PDU session with multiple PDU session anchors approach may apply the same PDU session for both local and non-local traffic. That may lead to the need to install filtering rules in the local network which define local traffic to be offloaded. Such filtering may cause inflexibility, as it may be difficult to define them in advance. Having the same PDU session may also make it difficult to apply Ethernet based local networking while using IP based central operator or internet services.

These systems may apply to IP based traffic. However, in cases of local TSN networks, it may be necessary to apply Ethernet level networking control. This can be motivated by the need of a central TSN controller in the local network, which would control both the mobile (5G or 4G) and the fixed network parts. Even the Ethernet Based Local IP Access solution may rely on the IP address to MAC address mapping and its updates, and hence, it may not be suitable in cases where Ethernet based control mechanisms need to be applied. Furthermore, in some (e.g., industrial) cases the endpoints are pure L2 hosts and may not even have an IP stack implemented.

Some embodiments of inventive concepts are illustrated in FIG. 1. These embodiments are described in the context of the 5G system architecture framework (see, Reference [3] and Reference [4]), but these embodiments may be equally applied to other system architectures as well such as a 4G system (see, Reference [5]).

According to some embodiments, the setup of a special type of PDU session (herein referred to as RAN breakout PDU sessions) may be provided with the following properties:

The gNB may directly connect to the local network in the user plane. In FIG. 1, the gNB connects to the local network via a Switch SW. Note that other interfaces to the local network may also be possible, but in this embodiment, this interface may be considered as an Ethernet switch. Note that there may be implementations where the switch SW and the gNB are kept separate, with an interface in between where user plane packets can be tunneled. However, such an approach may imply extra complexity and will not be further elaborated here.

There may be no additional CN user plane entities in the user plane path. Stated in other words, there may be no separate UPF in the architecture.

The Session Management Function SMF (the control plane entity responsible for managing the UPFs) may have reduced functionality, hence it is referred to as a S-SMF (Simplified-SMF). The S-SMF may exist as a separate entity, or may be co-located with/merged into the AMF (Access and Mobility management Function). There may be no signaling between the S-SMF or any user plane entity, given that there is no UPF in the approach. The S-SMF entity is responsible for terminating PDU Session signaling towards the UE, which is forwarded via the gNB and AMF.

Certain types of AMF-SMF signaling (which is otherwise normally executed for PDU sessions) may be omitted. Such omitted signaling may include N3 tunnel update messages to the UPF or handover indications from AMF to SMF.

At least one user plane identity for the PDU session may be maintained in the CN, in the AMF, and/or in the S-SMF. The user plane identity may have an Ethernet MAC address, an IPv4 or IPv6 address/prefix, or both. Multiple ones of such identities may be associated with a single PDU session. The user plane identity may also be extended with other user plane information such as VLAN ID, or the address (Ethernet or IP) of the peer entity, or other header information. All of these information elements may form an ACL (Access Control List) which determines through the use of filters whether a given packet or frame is destined to a given UE or not. When the UE is connected to RAN, the ACL (identifying the user's traffic) is stored in the RAN context stored in the gNB and is used to map the downlink user plane packets to the appropriate UE's radio bearer.

As discussed above, a RAN breakout PDU session may get special treatment in both the Radio Access Network RAN and the Core Network CN. Accordingly, the RAN breakout PDU session may be differentiated from other PDU sessions. Note that the gNB may be split into separate sub-entities, such as a control plane part and a user plane part, which however, may not affect the essence of some embodiments.

According to some embodiments of inventive concepts, user plane and control plane delays may be reduced; systems may be simplified; costs may be reduced; and/or reliability may be improved. Moreover, support of local Ethernet based systems (including TSN networks) may be improved, which can potentially span both the wireless and fixed parts of the network.

As both CN and RAN functions may work differently according to some embodiments of inventive concepts, a RAN-breakout PDU session may need to be identified and indicated for all concerned entities. There are a number of alternatives that can be considered for RAN-breakout PDU sessions according to some embodiment as follows:

A special PDU session type may be defined for a RAN-breakout PDU session. Such a PDU session type may be: RAN-breakout Ethernet PDU session. It may be possible to introduce additional PDU session types whether or not an IPv4 address and/or an IPv6 prefix is assigned by the system as well. It may also be possible to define a RAN-breakout IPv4 or a RAN-breakout IPv6 session. The PDU session type may be indicated from the CN to the RAN as well. The PDU session type may be indicated from the UE to the CN over NAS signaling during the PDU session establishment. The UE may be pre-configured with the PDU session type. OTA (Over The Air) configuration methods may be applied to set the PDU session type in the UE.

An indication may be possible to introduce for a RAN-breakout PDU session in addition to the PDU session type. In this case, the PDU session type could be, for example, Ethernet, IPv4 or IPv6, and for each of these PDU session types, a RAN-breakout indication can be defined from the UE to the CN over non-access stratum NAS signaling. Similar configuration methods may also apply for the RAN-breakout indication.

The RAN breakout session may also be determined in the CN based on subscription or pre-configuration. Based on a combination of UE identities (e.g., IMSI, IMEI, MAC address, or other types of user or equipment identifiers), local operator policies, subscription records, current location of the UE, network slice identifier, or other network-internal parameters, the CN (or specifically the AMF entity) may declare that a session should be RAN-breakout session. As a result of this determination, the PDU session type may also be modified. In case of RAN-breakout session, this is also indicated to the RAN or to the S-SMF.

The identity of the gNB can also be taken into account in the determination.

A determination whether a given session is a RAN breakout PDU session can be made by the AMF using the criteria discussed above. Once the determination is made, the SMF selection can be made accordingly, taking into account whether the session is a RAN breakout session or not. Alternatively, the determination of whether the session is a RAN breakout session can also be made in the SMF, but in that case the SMF selection cannot be dependent on that (or else an SMF re-direction approach may be needed).

To determine how to route downlink user plane packets to the appropriate UEs, a user plane UP address (or more generally, an ACL) for a UE may need to be set. This UP address may be based on an Ethernet MAC (Medium Access Control) address, but in certain cases it may also be based on an IPv4 address or an IPv6 prefix, or may be extended with filters for other header fields as well. The ACL is sent to the RAN entity (gNB) when the RAN context is established. At least one user plane address in the ACL may be necessary for each PDU session, but there may be more addresses in certain cases. There are a number of alternatives how the ACL can be set as discussed below:

A static user plane address may be provided by the UE during PDU session establishment. This may be the case, for example, for Ethernet PDU sessions, with the fixed MAC address provided from the UE to the CN. The ACL can be constructed based on the user plane address; optionally, the UE may provide additional header fields as well that also become part of the ACL.

A static ACL with the user plane address may be provided in the UE subscription. This could be, for example, a static IPv4 address, which is assigned statically based on a user identifier such as an IMSI.

An ACL with the user plane address may be provided by the 3GPP system and stored in the CN user context. For example, an IPv6 address prefix may be provided to the UE and stored in the CN as well. The IPv6 address could be generated by the S-SMF, sent via the AMF to the gNB which provides it to the UE. The address may be stored (e.g., in the S-SMF and/or the AMF) and may be provided to the RAN entity (gNB) when the RAN context is established.

A user plane address may also be provided by non-3GPP methods (e.g., using DHCPv4 or DHCPv6). In that case, the Dynamic Host Configuration Protocol DHCP server may provide the address to the CN entity (S-SMF), or the gNB may recognize the DHCP signaling, and store the address itself (in addition to providing it to the CN). Other fields may also be set besides the user plane address, and together they form the ACL.

In case of dynamic address allocation, the UE may also provide its user plane address after it's user plane address has been assigned to it, for example, using NAS signaling to the CN.

A combination of the above methods may also be applied.

As a result of the ACL including user plane address setting, the CN provides to the RAN the ACL corresponding to a given RAN-breakout PDU session. This may make it possible to map a downlink packet to a given UE at the gNB. The downlink user plane packet may be checked against the filter settings in the ACL so that it is mapped to the appropriate UE.

Figure 2:
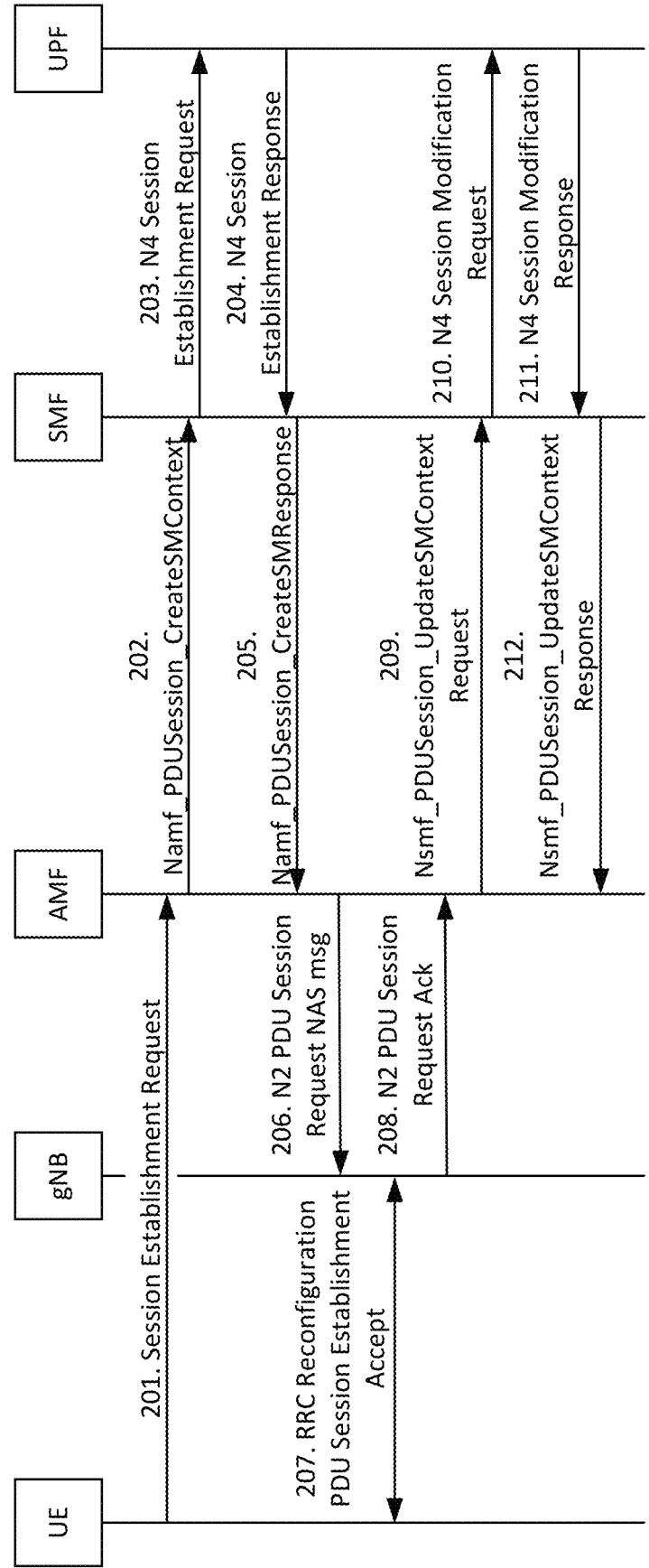
FIG. 2 is a message diagram illustrating PDU session establishment for a non-breakout PDU session with UPF co-located with the gNB according to some embodiments of inventive concepts.

FIG. 2 is a message diagram illustrating a PDU session establishment procedure. While shown separately from the base station node gNB, the UPF may be considered to be collocated with the base station node gNB. Operations of FIG. 2 may apply for non-breakout PDU sessions. At operation 203, wireless terminal UE may transmit a session establishment request through base station node gNB to CN entity AMF, and at operation 203, CN entity AMF may transmit a Namf_PDUSession_CreateSMContext message to CN entity SMF. CN entity SMF may transmit an N4 Session Establishment Request to UPF entity at operation 203, and UPF entity may reply with an N4 Session Establishment Response at operation 204. CN entity SMF may then transmit an Namf_PDUSession_CreateSMResponse to CN entity AMF at operation 205. CN entity AMF may transmit an N2 PDU Session Request NAS message to base station node gNB at operation 205, and at operation 207, wireless terminal UE and base station node gNB may perform RRC Reconfiguration and PDU Session Establishment Accept at operation 207. Base station node gNB may transmit an N2 PDU Session Request Ack message to CN entity AMF at operation 208, and CN entity AMF may transmit an Nsmf_PDUSession_UpdateSMContext Request message to CN entity SMF at operation 209. At operation 210, CN entity SMF may transmit an N4 Session Modification Request to UPF entity. At operation 211, UPF entity may transmit an N4 Session Modification Response message to CN entity SMF. At operation 212, CN entity SMF may transmit an Nsmf_PDUSession_UpdateSMContext Response.

Figure 3:
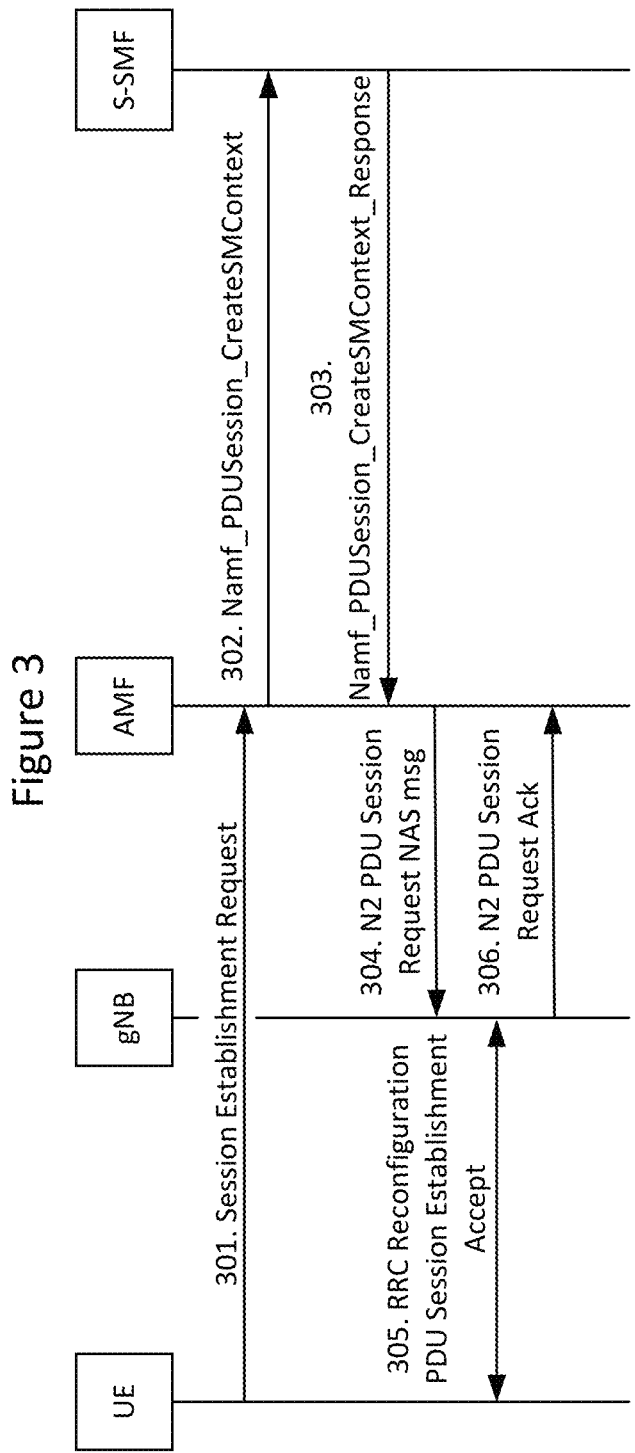
FIG. 3 is a message diagram illustrating PDU session establishment for RAN breakout PDU session according to some embodiments of inventive concepts.

FIG. 3 is a message diagram illustrating a modified procedure for a RAN breakout PDU session. In this case, the signaling between the CN entity SMF and the UPF entity may be reduced/omitted. Also, the N2 tunneling info may not be needed in the AMF-gNB signaling. Further, the AMF may not need to contact the SMF after the N2 PDU Session Request Ack is received, since there is no need to update any tunneling info. Either the AMF or the SMF may determine that the given session is a RAN breakout PDU session, and the other entities may be informed about this determination. As shown, signaling may be reduced. Here, the SMF may be referred to as S-SMF since its functionality may be reduced. In some embodiments, the S-SMF may be merged with the AMF.

Figure 4:
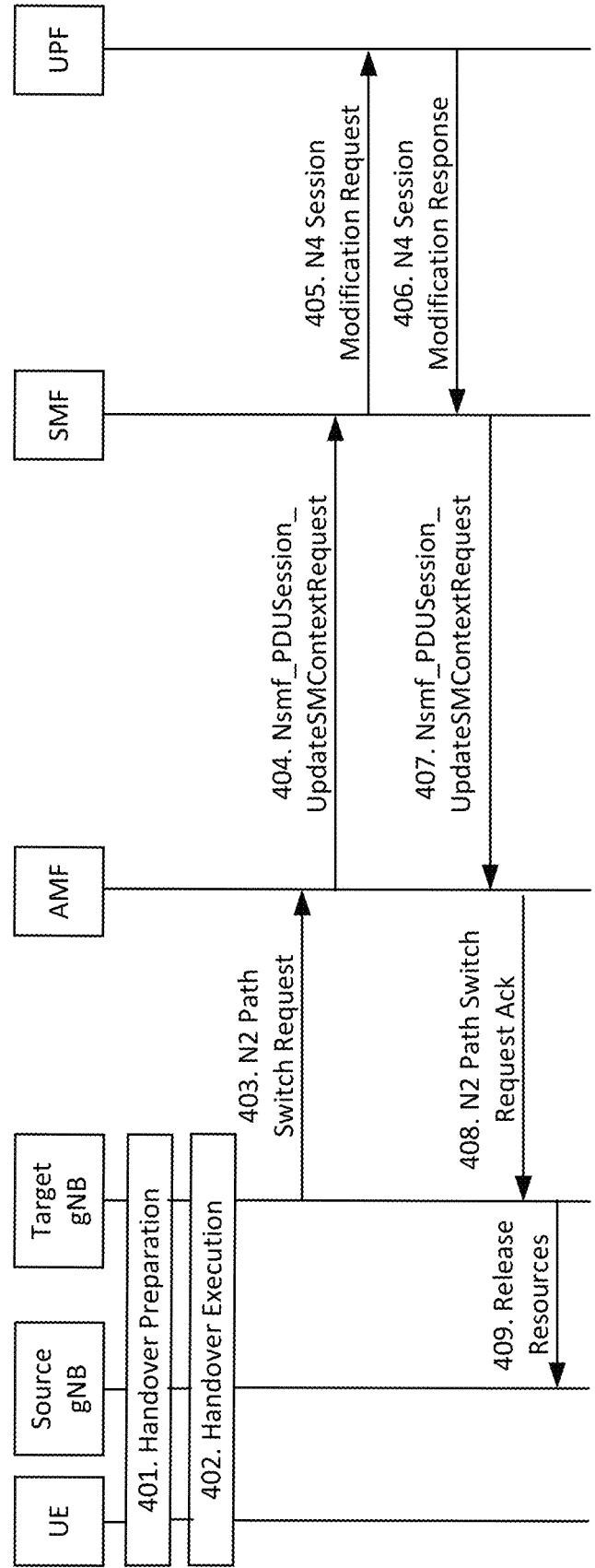
FIG. 4 is a message diagram illustrating an Xn handover in a 5G system for a non-breakout PDU session according to some embodiments of inventive concepts.

FIG. 4 is a message diagram illustrating a handover signaling procedure for a case involving a central UPF for a non-breakout PDU session. A co-located UPF may be insufficient in this case, since in the standard architecture a user plane anchor point may be needed to handle a handover.

Figure 5:
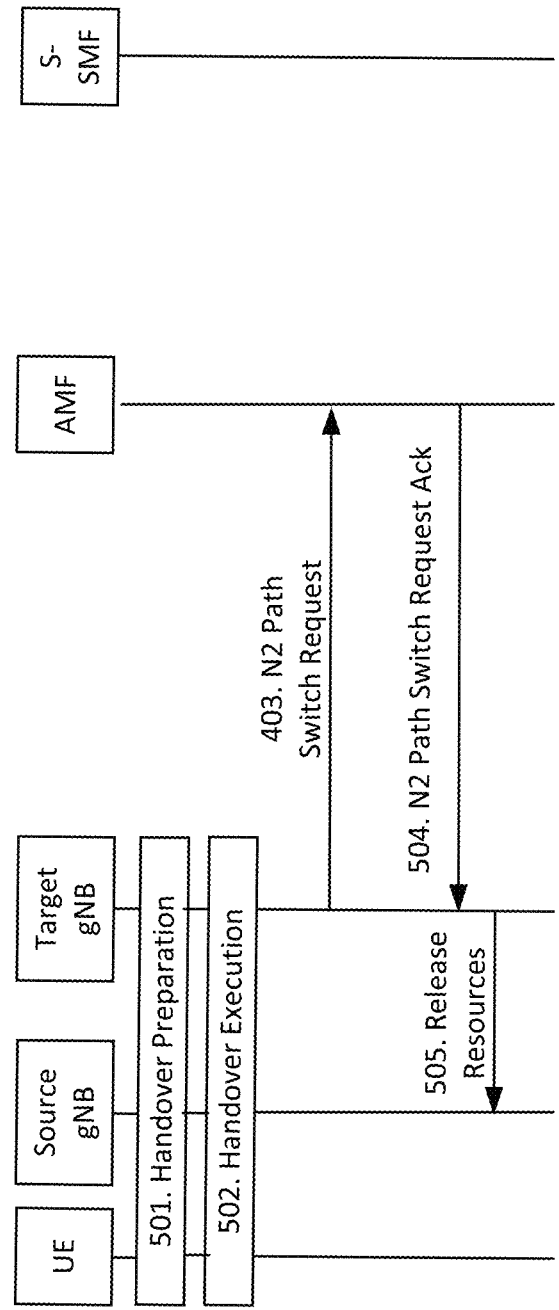
FIG. 5 is a message diagram illustrating an Xn handover for a RAN breakout PDU session according to some embodiments of inventive concepts.

FIG. 5 is a message diagram illustrating handover signaling for a RAN breakout PDU session. In this case, there may be no need for a central UPF, since the local network (such as an Ethernet network) can handle the user plane forwarding, as discussed below. As there is no N2 tunnel to manage during handover, signaling between the AMF and the SMF can be reduced/avoided, thereby simplifying the control signaling.

Other system procedures can be adjusted similarly for a RAN breakout PDU session.

Unlike current mobile systems, a RAN-breakout PDU session according to some embodiments of inventive concepts may not provide a mobility anchor point in the core network. Accordingly, an approach for user plane forwarding in the downlink may be needed so that downlink packets are forwarded to the appropriate gNB depending on the current location of the UE.

User plane forwarding, for example, may be based on MAC learning according to some embodiments of inventive concepts. Ethernet MAC learning may be applied to dynamically update the forwarding tables when a UE appears, disappears or its location changes. Using a MAC learning approach, Ethernet forwarding may be applied as follows:

In case a switch SW in the local network does not know about the location of a UE with a specific unicast MAC address, the packet can be flooded, where this flooding may be limited to ports that are part of the active topology of the broadcast domain. However, it should be possible to configure the gNBs such that the flooded packets are not forwarded towards the UEs with a different unicast MAC address to protect the privacy property of the 5G network so that only the addressed UEs receive the packets that are destined to them. This should be configurable, as there may be scenarios where frames with unknown unicast MAC address destinations should still be forwarded, such as in the case of moving networks where there may be multiple Ethernet devices behind a single UE. The gNB (together with its attached SW) can determine whether the UE with the given MAC address is connected to it by checking the ACL including the user plane address (in this case the MAC address) stored in the UE context. Hence, the gNBs should apply the flooding mechanism with this special condition that flooding may not apply over the air interface depending on configuration.

When the UE connects to a new gNB, its location within the local network should be updated. A UE connects to a new gNB when: attaching (registering) to the network; performing a handover; moving to connected state; or moving to a new gNB while being inactive. Using a broadcast frame/packet, for example, all other switches SWs in the local network can learn which direction the given UE is reachable, and hence reduce/avoid the flooding based packet forwarding as mentioned above. Such a broadcast packet may, for example, be: in case IPv4 is used, a gratuitous ARP packet; or in case IPv6 is used, an Unsolicited Neighbor Advertisement (RFC 4861) packet. The broadcast packet may also be an empty Ethernet frame (e.g., when communication is Ethernet based), or other types of packets as well. For a broadcast packet to be effective for MAC learning, only its source address may need to be looked at. Multiple broadcast packets, possibly of different types of packets, can also be sent, providing higher reliability for the broadcast transmission. In order to improve/optimize flooding, the Ethernet network may be configured for sticky MAC learning so that the MAC table entries do not age out even if no traffic is sent by a source after the first packet.

Figure 6:
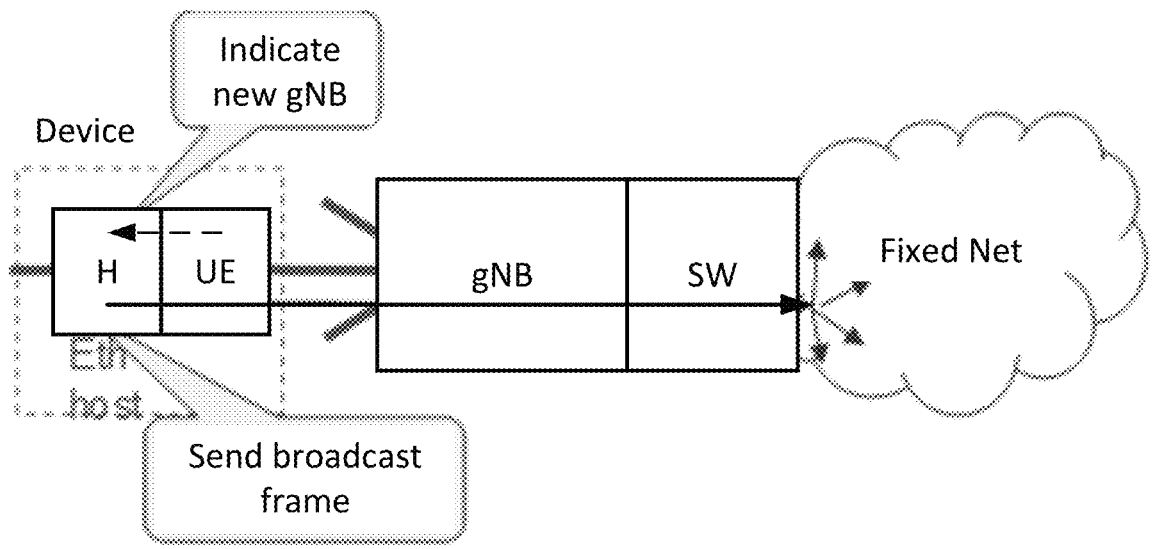
FIG. 6 is a schematic diagram illustrating a broadcast trigger based on UE detection of new gNB according to some embodiments of inventive concepts.

For this approach to work, the broadcast packet (Ethernet frame) may need to be triggered when the UE appears at a new gNB. There can be several variants for this trigger. As a first option, when the UE detects that it moves to a new gNB (i.e., when it attaches to the network, when it performs handover, when it moves from idle to connected mode, or when it moves in connected inactive mode), the UE may inform the Ethernet host module within the device through a device-internal Application Programming Interface API that the UE has appeared at a new gNB. This triggers the Ethernet host to send a broadcast packet (frame), where the broadcasting is carried out by the switch SW collocated with the gNB. The approach is illustrated in FIG. 6 where a broadcast trigger is based on UE detection of new gNB according to some embodiments of inventive concepts.

Three types of traffic may be flooded in an Ethernet network by default: broadcast, unknown unicast, and (unknown) multicast (a.k.a. BUM traffic). Any of such a traffic can be used to update the MAC address table entries of switches. An advantage of the broadcast mechanism is that it may be guaranteed to reach all Ethernet hosts in the local network. On the other hand, the broadcast mechanism may cause the Ethernet hosts to parse the frame to determine if further processing is needed. An advantage of the unknown unicast mechanism is that it updates the forwarding tables without the need to parse the frame, but it may require the configuration of a unicast address that is not present in the local network.

Detection of a new gNB may be based on the UE's determination that it connects to a new gNB entity, where the identity of the gNB may be based on RAN broadcast information. This information, however, may be limited in certain deployment scenarios. It may be possible that the UE is only aware of a cell identifier, but multiple cells are served by the same gNB. It can be possible to trigger a UE broadcast each time the UE moves to a new cell, even though such a broadcast would be redundant if the actual gNB does not change. To reduce/avoid such redundant broadcasts, the gNB can also broadcast information over the air interface about its identity so that the UE can determine whether a new cell implies a gNB change or not. Note also that a logical gNB may be split into separate control plane and user plane entities in the upper layer, and even if the control plane gNB entity does not change, the user plane gNB entity may be changed. In that case, it may be necessary to broadcast information that identifies the user plane part of the gNB, so that the UE can detect when it has changed. However, sending additional broadcast information may imply increase overhead.

Figure 7:
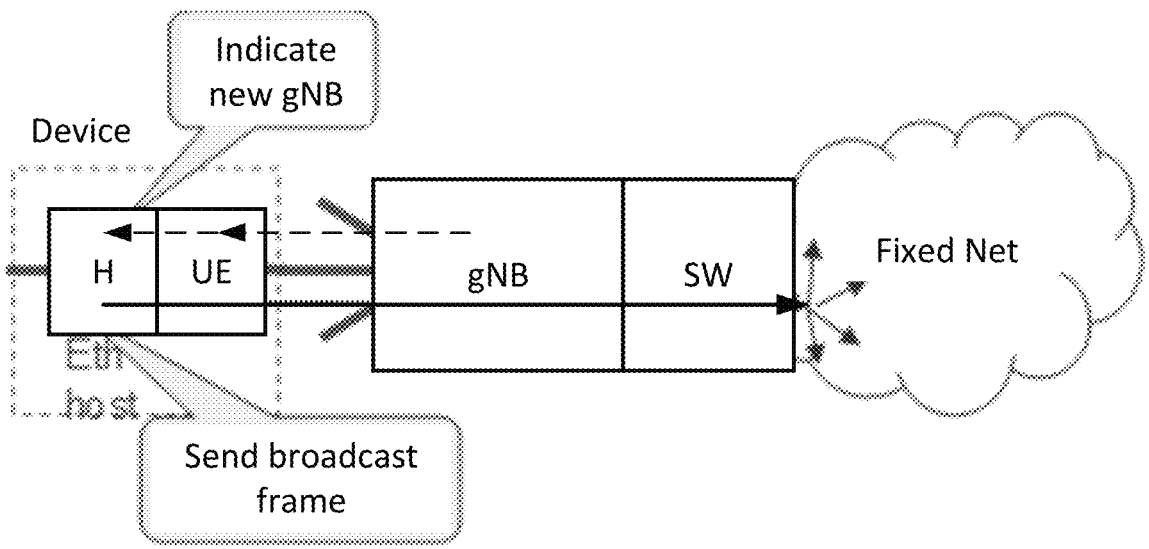
FIG. 7 is a schematic diagram illustrating a broadcast trigger based on explicit indication of a new gNB in the 5G system according to some embodiments of inventive concepts.

As a second option, instead of the UE detecting on its own when it has moved to a new gNB, an explicit indication from the network to the UE may be added when the UE appears at a new gNB. In this case, it may be easier to avoid false triggers, and it may also be possible to adjust this indication appropriately in case the gNB logical entity is internally split up into multiple parts, separately in control and user plane (again, triggering the UE may be needed when the user plane part of the gNB, collocated with a SW, changes). This approach is illustrated if FIG. 7 where a broadcast trigger is based on an explicit indication of a new gNB in the 5G system.

When the UE connects to a new gNB, the new gNB may indicate to the UE (e.g., using RRC signaling) whether it has moved to a new gNB (or more specifically, whether the user plane part of the gNB is new in case of a split node). This may be done in two ways: either the gNB always indicates an identity of the (user plane part of the) gNB, and the UE detects whether there has been a change; or the RAN only sends the indication in case the user plane part of the gNB has changed (this can be done by keeping the last value of this information in the RAN context of the UE). Using the indication, the UE may indicate the change trigger to the Ethernet host in the device, which sends a broadcast frame based on the trigger. Note that instead of using RRC signaling, NAS signaling may be applied for the trigger towards the UE. In that case, the trigger may be sent from the AMF via the gNB to the UE, based on updated location information from the gNB. Besides NAS, other protocol options may also be used.

Figure 8:
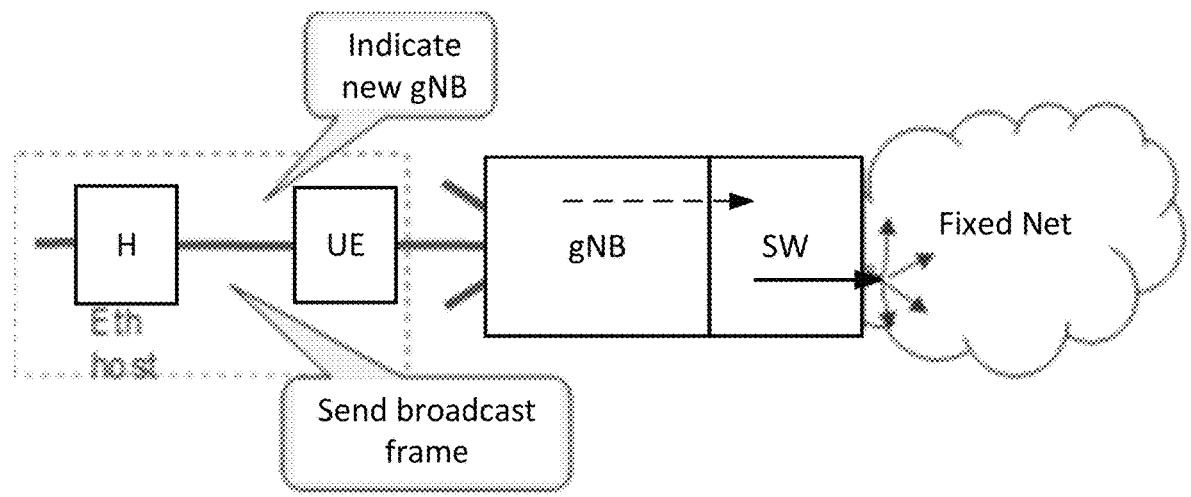
FIG. 8 is a schematic diagram illustrating a gNB broadcast on behalf of the UE according to some embodiments of inventive concepts.

An additional option could be possible, which is suited to scenarios where the triggering of UE broadcasts is problematic (e.g., due to the lack of API support between the Ethernet host and the UE within the device for the triggering of a broadcast Ethernet frame). In this case, the switch SW may generate such an Ethernet broadcast on behalf of the UE, based on the information available from the gNB internally within the RAN node. The gNB can provide a notification to the SW when a new UE connects to the gNB, and also provide its MAC address as that is part of the ACL stored in the RAN context in the gNB. Based on this notification, the SW generates an Ethernet frame with the given MAC address as the source, and broadcasts it in the local network, thereby updating the forwarding entries. This approach is illustrated in FIG. 8.

Figure 9:
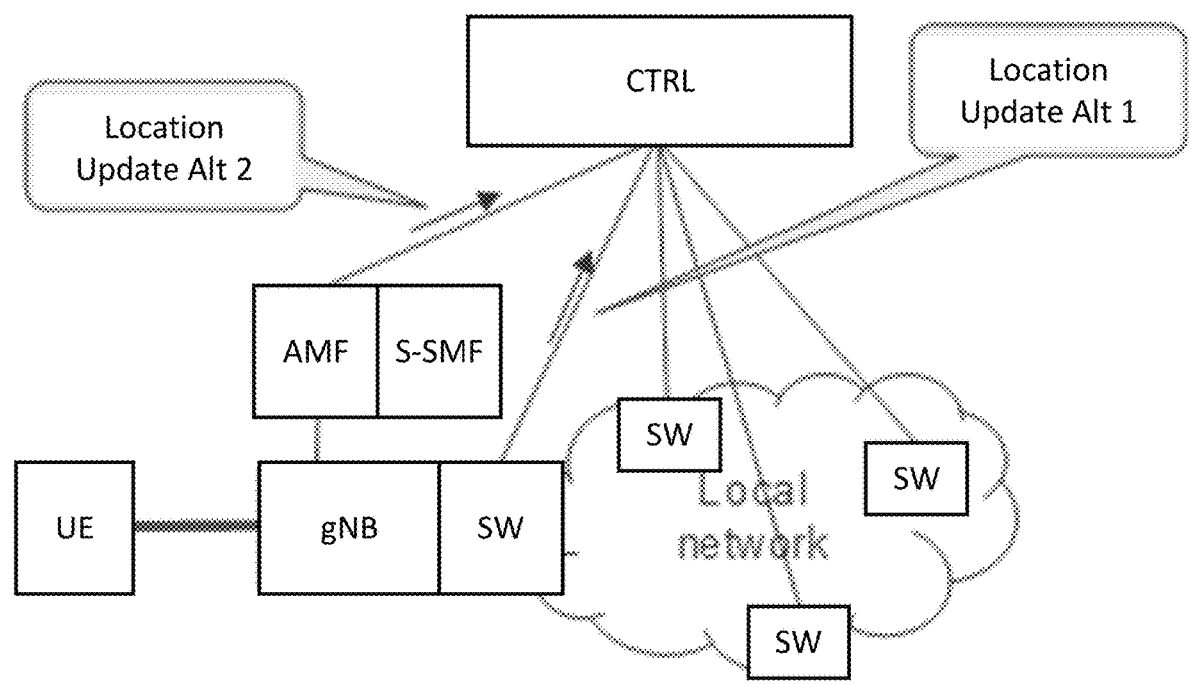
FIG. 9 is a schematic diagram illustrating centrally controlled user plane forwarding according to some embodiments of inventive concepts.

Another approach may be to apply a central controller CTRL which sets the user plane forwarding, based on knowledge of the full topology. This can be done by central setting of the MAC forwarding tables in case of an Ethernet network, or setting the IP routing tables in case of IPv4 or IPv6 networks. This centrally controlled user plane forwarding approach is illustrated in FIG. 9. The approach of FIG. 9 may be well suited for special traffic flows, such as TSN flows.

The central controller CTRL approach may require that the location of the UE is also communicated to the central controller, so that the central controller knows which gNB (and associated SW) the UE is attached to. This information may need to be updated each time the UE connects to a new gNB, and each time the UE connection to an old gNB is released. The UE can be identified by its user plane address (MAC address or IP address), which is available in the gNB in the context of this solution as part of the ACL.

As a first alternative, update information can be sent either from the SW collocated with the gNB to the central controller directly over an interface based on, for example, netconf or openflow.

As a second alternative, the UE location (which is reported from the gNB to the AMF) can be reported from the AMF to the central controller, which can be based on a newly defined interface. On this interface, the identity of the UE together with the identity of the gNB may be reported; where the gNB can be identified (e.g., by the SW that is collocated with the gNB). This approach, however, may require that the central controller is specific for a mobile network.

According to some embodiments, frame duplication may be provided at the gNB. It may be possible that a downlink packet (Ethernet frame) that the gNB handles may needs to be forwarded to more than one UE sharing the same broadcast (BC) domain (e.g., using the same VLAN). UEs sharing the same BC domain can have direct L2 communication (e.g., using the same VLAN). Examples for this may include:

Besides their unicast address, each UE may also have one or more multicast Ethernet addresses as part of their ACL. A multicast address may belong to multiple UEs which may connect to the same gNB.

The same unicast address may be used over multiple PDU sessions from the same UE. Using multiple PDU sessions with the same unicast MAC address may be done (e.g., for redundancy reasons).

In this case, the gNB may duplicates the downlink packet (Ethernet frame) and deliver it to all UEs that have an ACL that matches the packet.

As discussed above, it may be the case that a downlink packet is not delivered to any of the UEs at a given gNB. That may happen if flooding is used to deliver a packet to a UE whose location is currently not known. A flooded packet is not delivered over the air interface unless the ACL of the given UE matches the packet. This is to reduce/avoid privacy concerns over the radio interface.

A RAN breakout session may be defined on the Ethernet level, and if so, IP address assignment functionality might not always be needed. Nevertheless, in many practical deployments, the end devices would be assigned IP addresses as well. For a RAN breakout session, it could be possible to provide one or more IP address per session.

IP address assignment approaches may be classified into two main categories, depending on whether the 5G system explicitly supports the IP address assignment, or whether the IP address assignment takes place 'over the top', using dynamic IETF methods independent of the 5G system or static addressing.

Such dynamic IETF methods may include: IPv4 address assignment using DHCPv4; IPv6 address assignment using DHCPv6; or IPv6 stateless address auto-configuration triggered by the UE's router solicitation packet, which is answered by a router in the local network. These methods may need to be triggered by the Host stack above the UE in the device.

In case IP address assignment is managed by the 5G system, possible options include: IPv4 address assignment using NAS signaling during PDU session setup, where the address can be assigned by the S-SMF, possibly taking into account the fact that this is a RAN breakout session. In case of IPv6, the S-SMF may construct an IPv6 Router Advertisement packet on its own, and forward it to the UE via the AMF and the gNB. Alternatively, in case of an Ethernet based PDU session type, the S-SMF may send the IPv6 router advertisement in the user plane, directly addressed to the UE's MAC address.

Proper configuration of the device may be needed to know which method to use. One possible way of configuration could be to agree on the selected IP address assignment method (or lack thereof) during the UE's registration to the network or during the PDU session establishment. The UE may indicate which methods it supports, and the network may advise the UE as to which of the supported methods should be applied in the given local network.

In case of an IP based local network, a translation functionality may be applied, where a plain IP packet is mapped to an IP over Ethernet packet at the gNB.

As the approach may not apply a CN UPF where downlink packets in idle mode would be buffered, how CN idle mode would be handled may be defined.

Note that UEs with delay sensitive (TSN) traffic would typically not go to idle mode as they would have a regular traffic pattern. For UEs without delay sensitive traffic, it may be possible to apply a regular (non RAN-breakout) PDU session for which idle mode is handled regularly in the architecture. Avoiding idle mode handling for RAN breakout PDU sessions may simplify the approach. On the other hand, as idle mode is part of the standard and all UEs are expected to support it, it may be important to address idle mode in a local network scenario as well.

One possible approach to reduce/avoid idle mode handling is to keep the UEs with a RAN breakout session in connected mode all the time. This may be possible by setting a very long (infinity) timeout for the inactivity timeout for the RAN transition to idle mode; or alternatively letting the AMF reject transitions from connected to idle mode for PDU sessions that are RAN breakout sessions. It may also be possible to use the RRC inactive state in RAN by only using the RRC Inactive state as the "idle" state and not using the Idle state in the CN, by disabling the RAN connected to idle timeout. If the gNB does not have a connected UE, it initiates the RAN paging for a downlink frame, possibly via other gNBs, or falling back to the AMF triggered paging (if needed), using the appropriate procedures, which take care of delivering the downlink packet to the UE.

A more general approach, however, may be to support CN idle mode handling. This may also be important as UEs may get to CN idle mode also in error situations. Also, the CN idle mode may be more efficient for UE battery consumption, and may also reduce the RAN resource usage. The approach for handling paging in CN idle mode may be based on triggering and stopping the paging process locally at a gNB by a user plane packet.

1. Paging may be triggered at a gNB by the arrival of a downlink packet (frame) which does not have a corresponding UE connected to the gNB.
2. Paging may be stopped when the given UE owning the destination address of the packet becomes connected; or when a frame is received from the given address over the fixed network; or when paging is declared failed.

Figure 10:
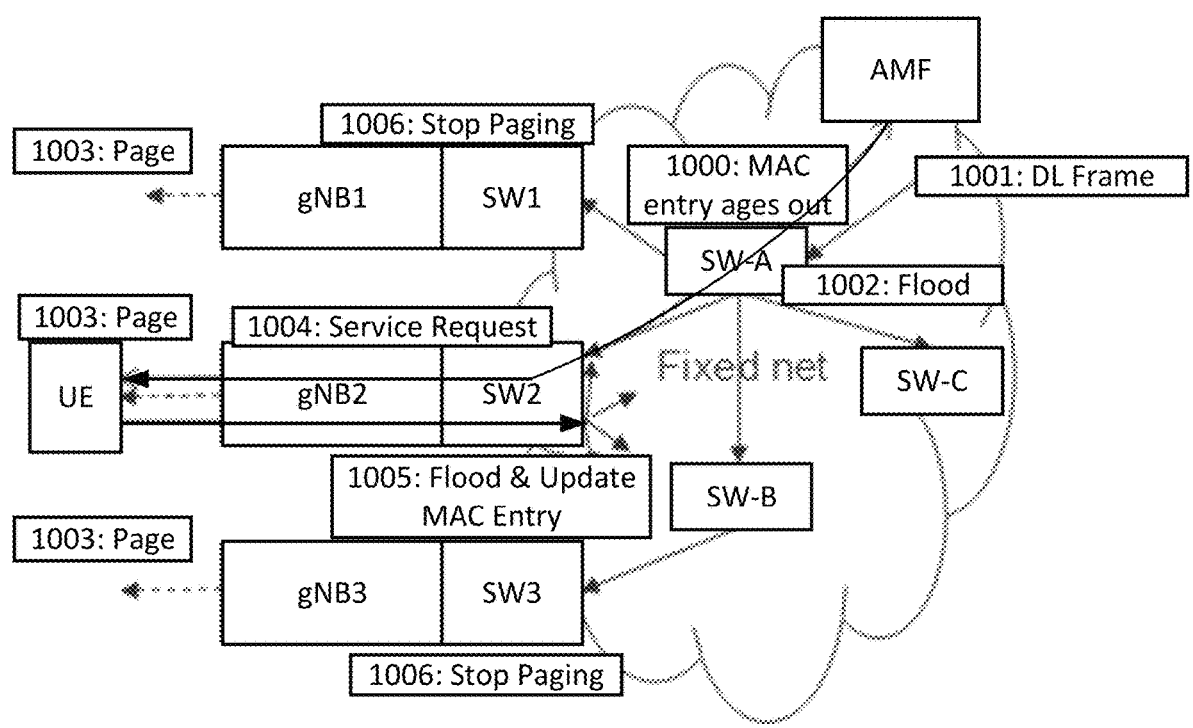
FIG. 10 is a schematic diagram illustrating paging according to some embodiments of inventive concepts.

Overall, some paging approaches may include operations as discussed with respect to FIG. 10. Such approaches may apply to a case when the UE is in idle mode (i.e., it is not connected to any of the gNBs in the network), and a downlink frame needs to be sent to the UE. Operations of FIG. 10 are discussed below.

Operation 1000. The MAC forwarding entry in the local network ages out for a UE in idle mode. This can be achieved via several methods (e.g., by tuning the MAC address aging parameter). MAC aging may be configured in such a way that by the time the UE becomes idle in the 5G system, the MAC address entry is removed in the local network. For this, the timeout for MAC aging may be set to a value that is not greater than the connected to idle timeout configured in RAN. Hence, in such a case, it may be necessary to harmonize the configuration of the 5G system and the local fixed Ethernet network. (This may apply also to cases when, for example, a per VLAN/per node setting of the MAC aging parameter is possible, where this should be harmonized with the RAN setting of the relevant UEs.)

An alternative option may be to use signaling between 5G and the Ethernet domain to trigger the UE specific MAC aging (i.e., purge the MAC address of the UE) in the Ethernet domain if the UE goes idle.

Operation 1001. A DL frame destined to the UE is sent in the local network.

Operation 1002. As the MAC forwarding entry corresponding to the UE has been aged out, the frame is flooded in the local network using the Ethernet flooding mechanism. Hence, the downlink frame reaches gNB1, gNB2 and gNB3.

Operation 1003. As the UE is not locally connected, gNB1, gNB2 and gNB3 start paging the UE.

Operation 1004. The UE responds to the paging at gNB2 by performing the Service request procedure to the AMF. The signaling between gNB2 and AMF may traverse the local fixed network, or alternatively it may traverse an alternative transport network as well. The Service Request procedure sets up the UE context at gNB2 and the UE becomes connected.

Operation 1005. The UE sends a local Ethernet frame when it becomes connected at gNB2. Such a frame could be, for example, a gratuitous ARP packet in case IPv4 is used sent as a broadcast frame; an Unsolicited Neighbor Advertisements (RFC 4861) packet in case IPv6 is used sent as a multicast frame; or any other Ethernet frame with the MAC UE's address as the source, which could be, for example, a unicast frame towards a not known destination address in the local network.

In case the UE is not able to trigger sending such a frame, the gNB may construct such an Ethernet frame on behalf of the UE and send it, in which case the UE does not need extra functionality for this and the frame is sent by the gNB. The gNB may know the MAC address used by the UE from the RAN context, based on a priori signaling, as discussed above with respect to setting a user plane address.

Operation 1006. When the flooded frame is received with the UE's MAC address as the source, gNB1 and gNB3 stop the paging process.

As discussed above, this approach may require coordinated configuration of parameters in the fixed network and in the RAN: the MAC aging timeout in the fixed part of the network should be not greater than the RAN connected to idle timeout. If the MAC aging timeout is smaller, this may lead to unnecessary flooding in the fixed network and unnecessary paging in RAN, yet the system can deliver the downlink frame. If the MAC aging timeout is bigger than the RAN connected to idle timeout, then the downlink frame will be delivered only if the UE has not moved to another gNB, since the paging will be triggered only at the gNB where the UE last had traffic to send.

If the UE has moved and the MAC aging timeout is bigger than the RAN connected to idle timeout, the downlink frame is delivered to the previous gNB where paging would fail. A possible approach to reduce the issue in this case could be that the gNB encapsulates the payload into a new frame, for example, by adding additional encapsulation headers, and sends it (e.g., using multicast), to other gNBs which then trigger paging. In this case, however, the same frame could be delivered multiple times. A heuristic approach to reduce/avoid such duplicates is that the receiving gNBs may check whether they have received the same payload already, and should trigger paging only in case the payload has not been received. Checking this could be achieved, e.g., by storing a copy of the payloads that have recently generated paging; or storing a hash of the payload. Storing is done in a pre-defined time-window only. A disadvantage of this approach though may be that it may not detect duplicates outside the time window, and that it may falsely remove duplicates in case they were sent by the original sender.

A downlink packet may arrive at a gNB which might not be the same gNB where the UE camps on in idle mode, hence it may be needed to trigger paging in the other gNBs of the local network as well. In some embodiments, a local network may be limited in size, and therefore, it may be possible that paging takes place at all gNBs of the local network if needed. Stated in other words, the local network is not further divided into TAs (Tracking Areas) so that the UE would only be paged in its current TA.

As discussed above with respect to identifying a RAN breakout PDU session, paging can be triggered by flooding the downlink user plane frame to other gNBs of the local network. This is possible by making use of the flooding mechanism present in a local Ethernet network, using the Ethernet mechanisms to enforce an active topology (e.g., RSTP—Rapid Spanning Tree Protocol). The flooded frames will trigger paging at the gNBs if the UE is not connected. Note that this may require appropriate configuration in the gNBs so that frames with unknown destination trigger paging rather than being dropped.

In rare cases, it may happen that the UE is connected at a gNB that gets a flooded downlink frame, despite the fact that the downlink frame triggered a paging at another gNB. This may not be a normal case, because as soon as a UE gets connected to a new gNB, a to be flooded frame is sent with the UE's source address, which updates the forwarding rules in the local network so that the frames destined to the given UE will be forwarded to the gNB where the UE is connected. However, in rare cases this frame might get lost, or there may be transient events in the network that prevent the forwarding rules from being properly updated. In those rare cases, the paging process may be unnecessarily triggered at the old gNB. As soon as the UE sends an uplink frame to the peer, the MAC forwarding will be properly updated in the local network, hence such rare events may be very limited.

A different approach to the question of triggering the paging may be provided as follows. Rather than flooding the downlink frame to other gNBs (operation 1002 of FIG. 10), a control message may be sent to all other gNBs in the local network to start paging. Such a control message may also contain parameters regarding the paging. The control message can be sent using Ethernet multicast to all other gNBs in the local network.

Triggered by the control message, the gNBs in the local network start paging. When the UE responds to the paging and gets connected at a gNB, a to be flooded frame is sent which updates the forwarding rules in the network. Based on this frame, the original gNB forwards the downlink frame towards its current location.

One advantage of this approach may be that it reduces/minimizes the amount of flooding in the local network and instead it only relies on a multicast paging triggering. One issue, however, may be that in case the UE happens to be connected at another gNB in some rare cases (as discussed above), it may become an issue how to deliver the downlink frame to the UE, since in that case a broadcast with the UE's address as the source would not automatically be sent. One solution could be that in such a case the gNB where the UE is connected would send such a frame on the UE's behalf. Another possibility is that the gNB where the UE is connected indicates it directly to the original gNB triggering the paging using control signaling, such that the original gNB knows where to forward the frame to. In that case, the frame may be e.g., tunneled to the appropriate gNB. The handling of this issue, however, may introduce additional complexity.

Alternatively, the control message used to trigger paging may be sent via a proxy node, which could be, for example, one or more AMFs or another entity, so that the proxy is responsible for sending the DL frame to all the gNBs in the local network. In case there are multiple proxies (e.g. for redundancy reasons), the gNB could send the control message to all proxies (required at least if gNB does not know which AMF is holding the context for the UE (in case only one has access to the context). If the proxy is the AMF, the triggering of paging could be done vie the "normal" paging procedures towards the gNBs, but the signaling towards the gNBs may need to be extended to include also the DL frame.

There are multiple network configurations with respect to the proxy and the data base it uses:
  Proxy with an internal database; and
  Proxy with an external database.

If the proxy is the AMF, the internal database could be the "normal" storage it has for data related to attached UEs under its control. The external database could be any database external to the AMF (e.g. the UDM/UDR). In case of a static/permanent relation between the permanent UE Identity and the equipment identity, the UDM/UDR could anyway hold the mapping between the UE identity and the MAC address (see, discussion above with respect to FIGS. 2, 3, 4, and 5).

Also, with this approach an advantage is that it may reduce/minimize the amount of flooding in the local network and may instead rely on the "normal" paging handling (i.e. triggered from the AMF).

To successfully carry out the paging over the air interface, the system may need a number of parameters. These parameters may include:
  The identity of the UE used for paging. This identity can be a (part of a) temporary identifier in the 5G system, or a permanent identifier.
  The paging DRX interval, which may be UE specific. This interval determines the periodicity of the paging attempts.
  An index used to calculate the paging offset, which could be, for example, calculated from (parts of a) user identity.
  The paging strategy to follow, which can, for example, determine: how many times to retransmit; how delay-sensitive the paging should be; etc. The paging strategy could be based on what is the past mobility history of the given UE, the QoS class of the frame, etc.

These parameters should be available at the gNB that needs to page the UE. Several options are possible how these parameters can be managed.

One option (option 1) is that these parameters may be maintained for each UE at each gNB in the local network. When the UE first gets connected at a gNB, the parameters are downloaded from the core network if it exists. All the gNBs synchronize these parameters between each other using control signaling that could be multicast between the gNBs. Each time there is a change in these parameters, an update is sent out. The information is indexed by the user plane address of the UE (i.e., MAC address), so that it can be looked up when a downlink frame arrives.

Another option (option 2) is that these parameters are maintained in a central database that is accessible to all the gNBs in the local network, either directly or via a proxy, and the information can be fetched on demand, when useful/necessary for the paging to be carried out. The central database could be accessed, for example, from a proxy (e.g. one or more AMFs), or from a separate server.

Applying option 2 it may also be possible to let the proxy trigger the paging and consequently the gNB receiving the DL frame does not "fetch" the information, as described above.

There are multiple ways in which the mapping between the equipment address and the parameters used for paging can be created. The mapping could be created statically between the permanent UE identity (SUPI) and the user plane address (MAC address in this case, which may also be regarded as an equipment identity in certain cases), for example, when provisioning the UEs, for UEs with a static/permanent relation between the permanent UE Identity and the user plane address or equipment identity. In this case, the mapping can be retrieved from the UDM/UDR by the AMF as part of retrieving subscription data for a UE that it does not hold subscription data for (e.g., at Attach).

Alternatively, if there is no static/permanent relation between the permanent UE identifier and the user plane address or equipment identity (e.g., in case the UE is equipped with a detachable SIM), the AMF could retrieve the equipment identity from the UE when it connects to the AMF using a procedure corresponding to the Identity Request procedure that exist for EPS as discussed in 3GPP TS 24.301 v15.1.1, 2018-01, Non-Access-Stratum (NAS) protocol for Evolved Packet System (EPS), Stage 3, Release 15 (also referred to as Reference [7]). The latter may require that the information element "Identity Type 2" is extended to cover also equipment identities including the MAC address. Note that the procedure and parameter names for 5GS would probably be different. For instance, the permanent equipment identifier is called PEI (Permanent Equipment Identifier) and is in the work preceding protocol specification work in 3GPP described to include the identity types IMSI and IMSISV as discussed in 3GPP TR 24.890, v15.0.0, 2017-12, 5G System—Phase 1; CT WG1 Aspects, Release 15 (also referred to as Reference [8]). The PEI may thus have to be extended to cover also equipment identities including the MAC address.

Another approach for establishing the relation between the permanent UE identifier and the user plane address or equipment identity is to set up this relationship during the PDU session establishment. Either the UE may provide the user plane address to the AMF or to the SMF, or the SMF may acquire the user plane address either by configuration, or by querying an external database (e.g., using DHCP, Radius, Diameter or other configuration protocols). Once the SMF acquires the user plane address, it may provide it to the AMF during the establishment of the PDU session. Other alternatives to establish the relation between the permanent UE identifier and user plane address may also exist.

A combination of the above options 1 and 2 may also be possible. For example, the parameters can be cached in the gNBs, but after a certain time the cached information may be released, in which case it can be retrieved from a central database.

As the UE connects to new gNB, a to-be-flooded frame is sent out (either by the UE, or by the gNB on the UE's behalf) which updates the forwarding tables in the local network for the UE's new location. This flooded frame is also received by all gNBs that are paging the UE, and it acts as a trigger to stop the paging process.

In error cases, the broadcast frame may be lost, in which case the paging continues until it fails. Also, in other rare cases (as discussed above), the UE may be connected at another gNB in which case a broadcast frame might not be sent, and the paging may continue until it fails, but this should happen only in rare abnormal cases and may not cause a problem.

A special situation may arise in case of a topology change in the fixed network, which may lead to temporary flooding of frames, generating a high number of paging attempts, and this may make the paging process slower. A possible option to handle this would be that a gNB starting paging would notify other gNBs (e.g., using multicast) about the start of the paging; and another gNB where the given UE under paging is connected (identified by its MAC address) would notify the gNBs (e.g., using multicast) that the paging should be stopped. Notification about stopping the paging could also be done by the gNB flooding the local network on behalf of the UE with a frame with the UE's MAC address as the source. This approach may stop paging at other gNBs even before the actual paging starts. But it may also be possible that the paging is delayed for a short period of time so that paging can be stopped before it even begins. This option may be applied only in special conditions: e.g., only when the management system configures it, based on an excessive number of paging attempts; or one gNB may trigger the use of this option based on the excessive number of paging attempts and notify other gNBs to also use this option.

In some network deployments, it may be possible that the UE leaves the local network but still gets served by the macro network coverage. This may be the case when the local network is being operated in cooperation with a wide area network operator, or by the very same wide area network operator itself.

The AMF may detect that the UE has left the local area by a Registration procedure (i.e., Tracking Area Update procedure). In that case, the network may take steps to reduce/prevent paging in the local are so that unnecessary paging can be reduced/avoided. This can be achieved by marking in the paging parameters that the UE is out of the local network. This can be flagged in the gNBs in case the parameters are stored in the gNBs (see above). For this, the AMF may indicate that the UE has left the local network (or when it re-enters the local network) to all gNBs, so that they can update the flag appropriately. In case the paging parameters are stored centrally, the AMF may indicate whether or not the UE has left the local network to this central parameter storage. In case the gNB knows that the UE is not in the local network, the paging is not performed and the downlink frame can be dropped.

In a 5G mobile system, one class of PDU sessions may be identified as a special type of PDU session referred to as RAN-breakout PDU session. For RAN-breakout PDU sessions, system procedures may be executed in a different way. In the user plane, there may be no UPF in the core network, and the RAN node may be directly connected to the local network. In the control plane, the SMF function may not signal with any UPF. Certain messages between the AMF and the SMF may be skipped, such as location update messages or user plane update messages. The user plane address, or more generally an ACL including a user plane address, may be part of the RAN context for the UE and the gNB. The RAN node may map downlink user plane packets into the appropriate radio bearer based on the ACL (user plane address). The RAN node can be configured to drop flooded packets (Ethernet frames) that are not explicitly addressed to a given UE. The RAN node may duplicate packets (Ethernet frames) that are addressed to multiple UEs based on their ACL.

Certain embodiments of inventive concepts may include: centrally controlled user plane forwarding, and/or distributed user plane forwarding based on a broadcast packet triggered when the UE connects to a new gNB. A paging approach is also shown according to some embodiments, where paging is triggered and stopped by flooded Ethernet frames.

Operations of a core network CN entity (e.g., an AMF node/server) of a wireless communication network will now be discussed with reference to the flow chart of FIG. 14. For example, the CN entity may be implemented using the structure of FIG. 13 with modules stored in memory 1305 so that the modules provide instructions so that when the instructions of a module are executed by processor 1303, processor 1303 performs respective operations. Processor 1303 of CN entity may thus transmit and/or receive communications to/from one or more base station nodes gNBs or other nodes/entities of a wireless communication network through network interface 1307.

At block 1401, processor 1303 may receive a session establishment request from a wireless terminal UE through a base station node gNB and through network interface 1307, for example, as discussed above with respect to operation 301 of FIG. 3. At block 1403, processor 1303 may determine that a breakout protocol data unit PDU session is to be established for the wireless terminal UE responsive to receiving the session establishment request. At block 1405, processor 1303 may transmit a request through network interface 1307 to the base station node gNB responsive to determining that the breakout PDU session is to be established for the wireless terminal (UE), for example, as discussed above with respect to operation 304 of FIG. 3. Moreover, the request may include an indication that the breakout PDU session is to be established for the wireless terminal UE.

The session establishment request of block 1401 and the request of block 1405 may further include a user plane address for the wireless terminal UE. Furthermore, the session establishment request of block 1401 may include an indication to request the breakout PDU session, and at block 1403, determining that the PDU session is to be established may include determining that the PDU session should be established based on the indication from the session establishment request. Moreover, determining that the PDU session is to be established at block 1403 may include determining that the PDU session is to be established based on at least one of an identity of the wireless terminal UE and/or an identity of the base station node gNB. In addition, the user plane address may be based on at least one of a medium access control MAC address for the wireless terminal UE and/or an internet protocol IP address for the wireless terminal UE. The user plane address for the wireless terminal UE may be included in an Access Control List, ACL, that is provided in the request.

The breakout PDU session may be at least one of an Ethernet breakout PDU session and/or an internet protocol IP breakout PDU session, and/or the session establishment request may be provided as a non-access stratum NAS message.

In addition, at block 1407, processor 1303 may initiate transmission of a notification through network interface 1307 to a central controller CTRL (also referred to as a control node) of the wireless communication network, and the notification may include the user plane address of the wireless terminal UE and an identity of the base station node gNB. For example, the notification may be transmitted as discussed above with respect to the location update notification from the AMF of FIG. 9.

Various operations of FIG. 14 may be optional with respect to some embodiments. For example, operations of block 1407 of FIG. 14 may be optional according to some embodiments.

Operations of a base station node gNB of a wireless communication network will now be discussed with reference to the flow charts of FIGS. 15A, 15B, 15C, 15D, 15E, and 15F. For example, the base station node gNB may be implemented using the structure of FIG. 12 with modules stored in memory 1205 so that the modules provide instructions so that when the instructions of a module are executed by processor 1203, processor 1203 performs respective operations. Processor 1203 of base station node gNB may thus transmit and/or receive communications to/from one or more other base station nodes or other nodes/entities of a wireless communication network through network interface 1207, and base station node gNB may transmit and/or receive communications to/from one or more wireless terminals through transceiver 1201.

If there is a request from the CN entity at block 1501, processor 1203 may receive the request through network interface 1207 from a core network CN entity (e.g., AMF node/server) at block 1503, for example, as discussed above with respect to operation 304 of FIG. 3. Moreover, the request may include an indication that a breakout PDU session is to be established for a wireless terminal UE and a user plane address for the breakout PDU session for the wireless terminal UE. At block 1505, processor 1203 may establish the breakout PDU session for the wireless terminal UE, for example, as discussed above with respect to operation 305 and/or operation 306 of FIG. 3.

If there is a downlink packet at block 1507, processor 1203 may receive the downlink packet through network interface 1207 from a local area network at block 1508, and the downlink packet may include the user plane address.

Responsive to the user plane address of the downlink packet matching the user plane address for the breakout PDU session for the wireless terminal (UE) for a unicast transmission at block 1509, processor 1203 may transmit (1511) the downlink packet over a radio interface to the wireless terminal UE in accordance with the breakout PDU session at block 1511.

The user plane address for the wireless terminal UE may be based on at least one of a medium access control MAC address for the wireless terminal UE and/or an internet protocol IP address for the wireless terminal UE. According to some embodiments, the breakout PDU session may be an Ethernet breakout PDU session, and the user plane address for the wireless terminal UE may be a medium access control MAC address for the wireless terminal. According to some other embodiments, the breakout PDU session may be an internet protocol IP breakout PDU session, and the user plane address for the wireless terminal UE may be an IP address for the wireless terminal.

According to some embodiments of inventive concepts, first and second breakout PDU sessions may be established for the wireless terminal UE to provide two paths for duplicate transmission of the same downlink packet. At block 1505, processor 1203 may thus establish first and second breakout PDU sessions for the wireless terminal UE responsive to the request, wherein the same user plane address is used for both of the first and second breakout PDU sessions. Accordingly, transmitting the downlink packet at block 1511 may include duplicating the downlink packet and transmitting the downlink packet to the wireless terminal in accordance with the first breakout PDU session and in accordance with the second breakout PDU session responsive to the user plane address of the downlink packet matching the user plane address for the wireless terminal (UE). The same downlink packet may thus be received by wireless terminal UE twice (via the first and second breakout PDU sessions), for example, to improve reliability by redundancy.

The user plane address for the wireless terminal UE may be included in an Access Control List ACL saved in memory 1205. According to some embodiments, the ACL for the UE may include the user plane address that is for unicast downlink transmissions to the UE, and the ACL for the UE may also include a multicast address that is used for multicast transmissions to a plurality of UEs. No address may be needed in the ACL for broadcast downlink transmissions, because the base station node gNB transmits broadcast downlink transmissions to all UEs connected with the base station node gNB.

According to some embodiments of inventive concepts, multicast and/or broadcast downlink transmissions may be supported to allow transmission of the same downlink packet to multiple wireless terminals. With a multicast transmission, for example, the same multicast address may be stored in ACLs in memory 1205 for multiple wireless terminals. At block 1503, for example, processor 1203 may receive a request from the CN entity (through network interface 1207) including an indication that a second breakout PDU session is to be established for a second wireless terminal, and at block 1505, processor 1203 may establish the second breakout PDU session for the second wireless terminal. A multicast address may also be provided for the first and second wireless terminals and the multicast address may be saved in the respective ACLs for the first and second wireless terminals. At blocks 1507 and 1508, a second downlink packet may be received over the local area network (through network interface 1207) at processor 1203, and the second downlink packet may include the multicast address. Responsive to the second downlink packet including the multicast address at block 1509, processor 1203 may transmit the second downlink packet to the first and second wireless terminals using the first and second breakout PDU sessions responsive to the multicast address of the downlink packet matching the multicast address of the respective ACLs for the first and second wireless terminals. At blocks 1507 and 1508, a third downlink packet may be received at processor 1203, and the third downlink packet may include a broadcast address. Responsive to the third downlink packet including the broadcast address at block 1509, processor 1203 may transmit the third downlink packet to all wireless terminals (including the first and second wireless terminals) in connection with the base station.

FIG. 15B illustrates base station node gNB operations when UE movement is detected. Responsive to detecting movement of the wireless terminal UE to the base station node gNB from another base station node at block 1521, processor 1203 may initiate transmission of an update packet through network interface 1207 to a plurality of nodes of the local area network at block 1523, and the update packet may include the user plane address for the wireless terminal. Transmission of such update packets is discussed above, for example, with respect to FIG. 8.

FIG. 15C illustrates base station node gNB operations when an update packet is received from the wireless terminal UE. Responsive to receiving an update packet from the wireless terminal UE over the radio interface (through transceiver 1201) at block 1531, processor 1203 may initiate transmission of the update packet through network interface 1207 to a plurality of nodes of the local area network at block 1533, and the update packet may include the user plane address for the wireless terminal. Transmission of such update packets is discussed above, for example, with respect to FIGS. 6 and 7.

FIG. 15D illustrates base station node gNB operations when a notification is transmitted to a central controller CTRL. At block 1541, processor 1203 may initiate transmission (1541) of a notification through network interface 1207 to a central controller CTRL at block 1541. Moreover, the notification may include the user plane address of the wireless terminal UE and an identity of the base station node gNB. Transmission of such notifications is discussed above with respect to FIG. 9.

FIG. 15E illustrates base station node gNB operations when a local connection with the wireless terminal is terminated. As discussed above with respect to FIG. 15A, a first downlink packet may be transmitted to the wireless terminal at block 1511. After transmitting the first downlink packet to the wireless terminal and after termination of the local connection with the wireless terminal UE at block 1551, processor 1203 may receive a second downlink packet through network interface 1207 at block 1508, with the second downlink packet including the user plane address for the wireless terminal UE as discussed above with respect to Operation 1002 of FIG. 10. Responsive to receiving the second downlink packet and responsive to termination of local connection with the wireless terminal UE, processor 1203 may transmit a page through transceiver 1201 over the radio interface to the wireless terminal UE at block 1553 as discussed above with respect to operation 1003 of FIG. 10. Processor 1203 may receive a page response from the wireless terminal UE through transceiver 1201 at block 1555, with the page response being responsive to the page, as discussed above with respect to Operation 1004 of FIG. 10. At block 1557, processor 1201 may provide connection with the wireless terminal UE responsive to the page response, and providing the connection may include providing a context for the wireless terminal including the user plane address for the wireless terminal in memory 1205 as discussed above with respect to Operation 1004 of FIG. 10. After providing the connection with the wireless terminal UE, processor 1203 may initiate transmission of an update packet through network interface 1207 to a plurality of nodes of the local area network at block 1559, with the update packet including the user plane address for the wireless terminal as discussed above with respect to Operation 1005 of FIG. 10.

According to some embodiments, initiating transmission of the update packet at block 1559 may include initiating transmission of the update packet responsive to providing the connection with the wireless terminal UE. According to some other embodiments, initiating transmission of the update packet at block 1559 may include initiating transmission of the update packet responsive to receiving the update packet from the wireless terminal (UE) over the radio interface.

FIG. 15F illustrates base station node gNB operations when a radio link is released. After transmitting a first downlink packet at block 1508, processor 1203 may release a radio link for the wireless terminal at block 1561. After releasing the radio link for the wireless terminal, processor 1203 may receive a second downlink packet including the user plane address for the breakout PDU session for the wireless terminal UE at block 1508. Responsive to receiving the second downlink packet after releasing the radio link, processor 1203 may initiate transmission of pages through transceiver 1207 over the radio interface for the wireless terminal UE at block 1563. After receiving the second downlink packet and after initiating transmission of the pages for the wireless terminal, processor 1203 may receive an Ethernet packet including the user plane address from a second base station node of the wireless communication network through network interface 1207 at block 1565. Responsive to receiving the Ethernet packet including the user plane address, processor 1203 may cease transmission of the pages for the wireless terminal at block 1567.

Figure 16A:
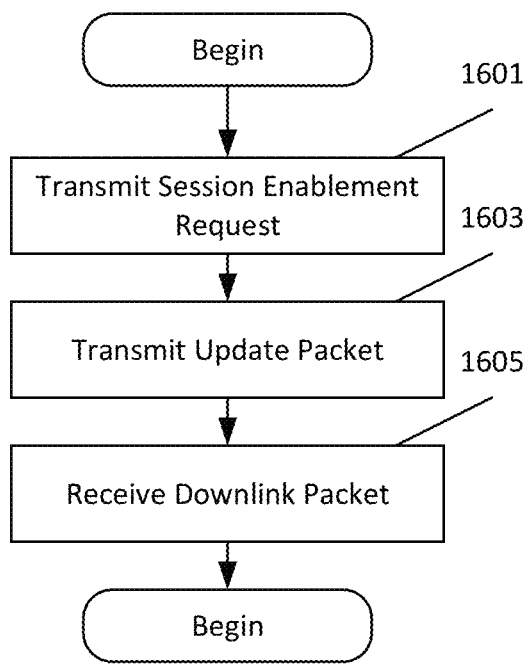
FIGS. 16A and 16B are flow charts illustrating wireless terminal operations according to some embodiments of inventive concepts.

Various operations of FIGS. 15A-F may be optional with respect to some embodiments. For example, operations of blocks 1501, 1505, 1507, 1509, 1513, 1515, 1521, 1523, 1531, 1533, 1541, 1551, 1553, 1555, 1557, 1559, 1561, 1563, 1565, and 1567 may be optional. Operations of a wireless terminal UE will now be discussed with reference to the flow chart of FIG. 16A according to some embodiments of inventive concepts. For example, the wireless terminal may be implemented using the structure of FIG. 11 with modules stored in memory 1105 so that the modules provide instructions so that when the instructions of a module are executed by processor 1103, processor 1103 performs respective operations. Processor 1103 of wireless terminal UE may thus transmit and/or receive communications to/from one or more base station nodes or other nodes/entities of a wireless communication network through transceiver 1101.

At block 1601, processor 1103 may transmit a session establishment request through transceiver 1101 over the radio interface through the base station node gNB to a core network CN entity AMF, and the session establishment request may include a user plane address for the wireless terminal UE. At block 1603, processor 1103 may transmit an update packet through transceiver 1101 over a radio interface to a base station node gNB of a wireless communication network, and the update packet may include the user plane address for the wireless terminal UE. At block 1605, processor 1101 may receive a downlink packet over the radio interface from the base station node gNB through transceiver 1101, and the downlink packet may include the user plane address.

The update packet may include at least one of an ARP packet, an Unsolicited Neighbor Advertisement packet, and/or an Ethernet frame. Transmitting the update packet may include transmitting the update packet responsive to detecting movement of the wireless terminal UE to the base station node gNB from another base station node. Transmitting the update packet may include transmitting the update packet responsive to receiving an indication over the radio interface from the base station node gNB.

The user plane address for the wireless terminal UE may be based on at least one of a medium access control MAC address for the wireless terminal UE and/or an internet protocol IP address for the wireless terminal UE. The downlink packet may be a downlink packet of an Ethernet breakout PDU session, and the user plane address for the wireless terminal UE may be a medium access control MAC address for the wireless terminal UE. The downlink packet may be a downlink packet of an internet protocol IP breakout PDU session, and the user plane address for the wireless terminal UE may be an IP address for the wireless terminal UE. Various operations of FIG. 16A may be optional with respect to some embodiments. For example, operations of block 1601 may be optional.

Figure 16B:
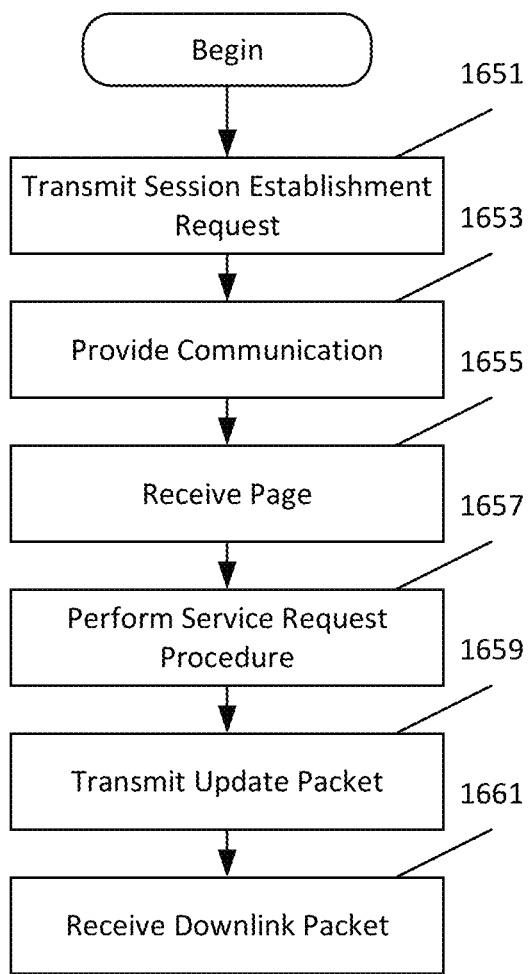

Operations of a wireless terminal UE will now be discussed with reference to the flow chart of FIG. 16B according to some other embodiments of inventive concepts. As discussed above, the wireless terminal may be implemented using the structure of FIG. 11 with modules stored in memory 1105 so that the modules provide instructions so that when the instructions of a module are executed by processor 1103, processor 1103 performs respective operations. Processor 1103 of wireless terminal UE may thus transmit and/or receive communications to/from one or more base station nodes or other nodes/entities of a wireless communication network through transceiver 1101.

At block 1651, processor 1103 may transmit a session establishment request through transceiver 1101 over a radio interface through a first base station node gNB1 to a core network CN entity AMF. At block 1653, processor 1103 may provide communication through transceiver 1101 and the first base station node gNB1 based on the session establishment request. After providing communication through the first base station node gNB1 based on the session establishment request, processor 1103 may receive a page from a second base station node gNB2 through transceiver 1101 at block 1655, and the page may include the user plane address for the wireless terminal. At block 1657, processor 1103 may perform a service request procedure to connect with the second base station node gNB2. At block 1659, processor 1103 may transmit an update packet through transceiver 1101 over a radio interface to the second base station node gNB2 responsive to connecting with the second base station node gNB2, and the update packet may include a user plane address for the wireless terminal UE. At block 1611, processor 1103 may receive a downlink packet through transceiver 1101 over the radio interface from the second base station node gNB2, and the downlink packet may include the user plane address. Various operations of FIG. 16A may be optional with respect to some embodiments. For example, operations of blocks 1651, 1653, 1655, and 1657 may be optional.

Figure 17:
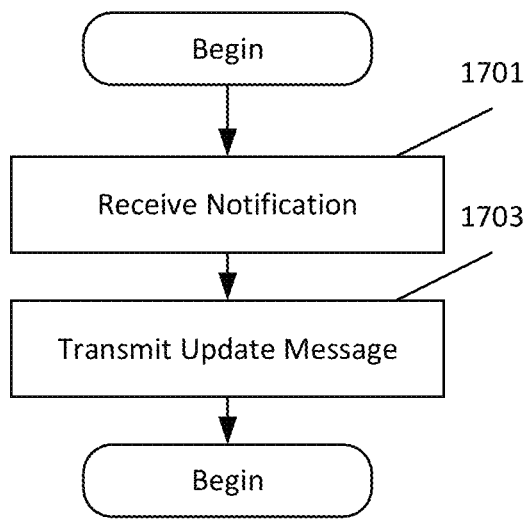
FIG. 17 is a flow chart illustrating operations of a central controller according to some embodiments of inventive concepts.

Operations of a central controller CTRL will now be discussed with reference to the flow chart of FIG. 17 according to some embodiments of inventive concepts where the central controller CTRL is couples with a plurality of nodes of a local area network. As discussed above, the central controller CTRL may be implemented using the structure of FIG. 13 with modules stored in memory 1305 so that the modules provide instructions so that when the instructions of a module are executed by processor 1303, processor 1303 performs respective operations. Processor 1303 of wireless terminal UE may thus transmit and/or receive communications to/from one or more base station nodes or other nodes/entities of a wireless communication network through network interface 1307.

At block 1701, processor 1303 may receive a notification through network interface 1307, with the notification including a user plane address of a wireless terminal UE and an identity of a base station node gNB. Responsive to receiving the notification, processor 1303 may at block 1703 transmit an update message through network interface 1307 to a plurality of nodes of a local area network to update respective address tables of the plurality of nodes of the local area network, wherein the update message includes the user plane address of the wireless terminal (UE) and the identity of the base station (gNB).

The user plane address for the wireless terminal UE may be based on at least one of a medium access control MAC address for the wireless terminal UE and/or an internet protocol IP address for the wireless terminal UE. According to some embodiments, the user plane address for the wireless terminal may be a medium access control MAC address, and the address tables of the plurality of nodes may be MAC forwarding tables. According to some other embodiments, the user plane address for the wireless terminal may be an internet protocol IP address, and the address tables of the plurality of nodes may be IP routing tables.

Figure 18:
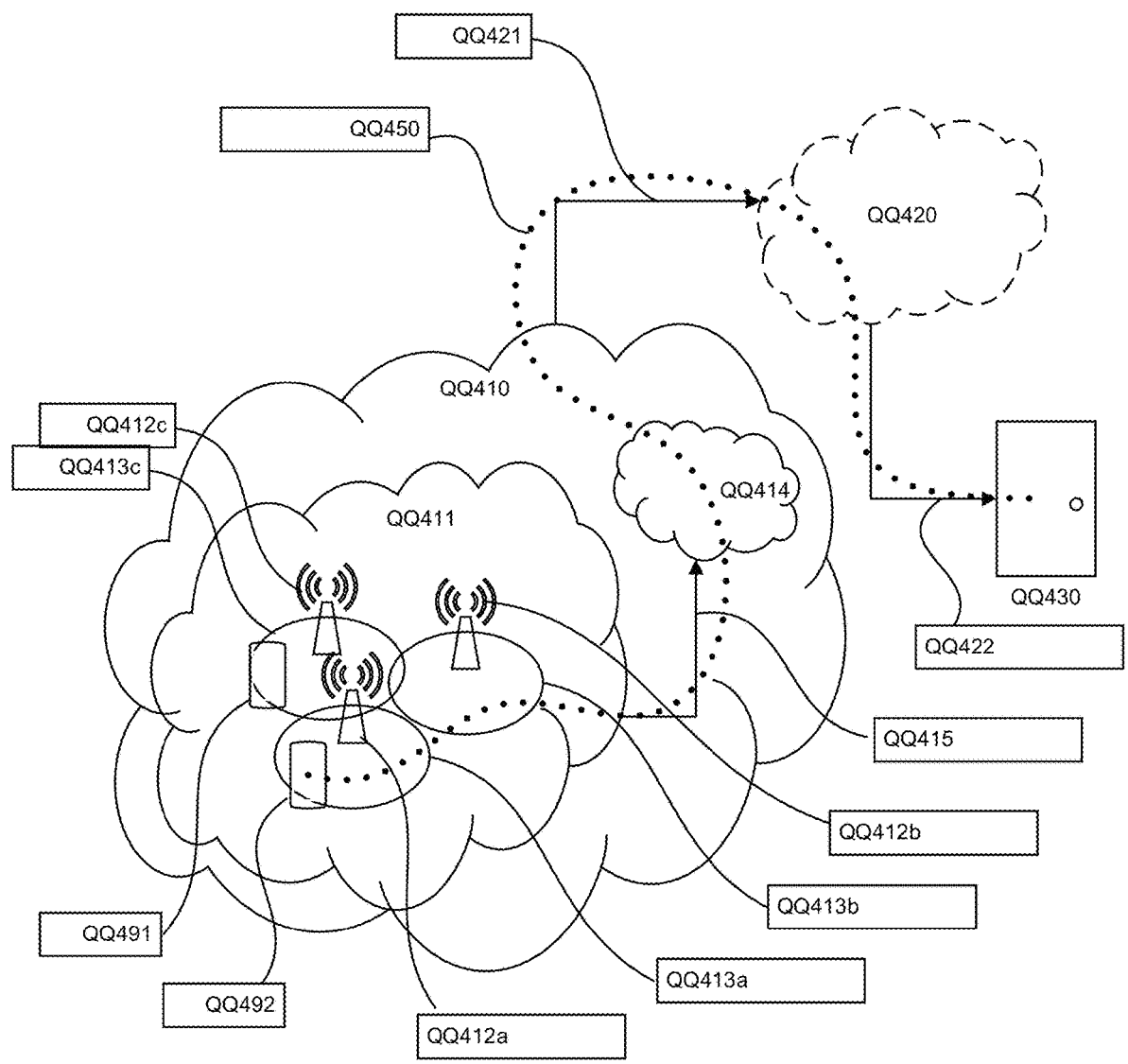

With reference to FIG. 18, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 18 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 19. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 19) served by base station QQ520. Communication interface QQ526 may be configured to facilitate connection QQ560 to host computer QQ510. Connection QQ560 may be direct or it may pass through a core network (not shown in FIG. 19) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 19:
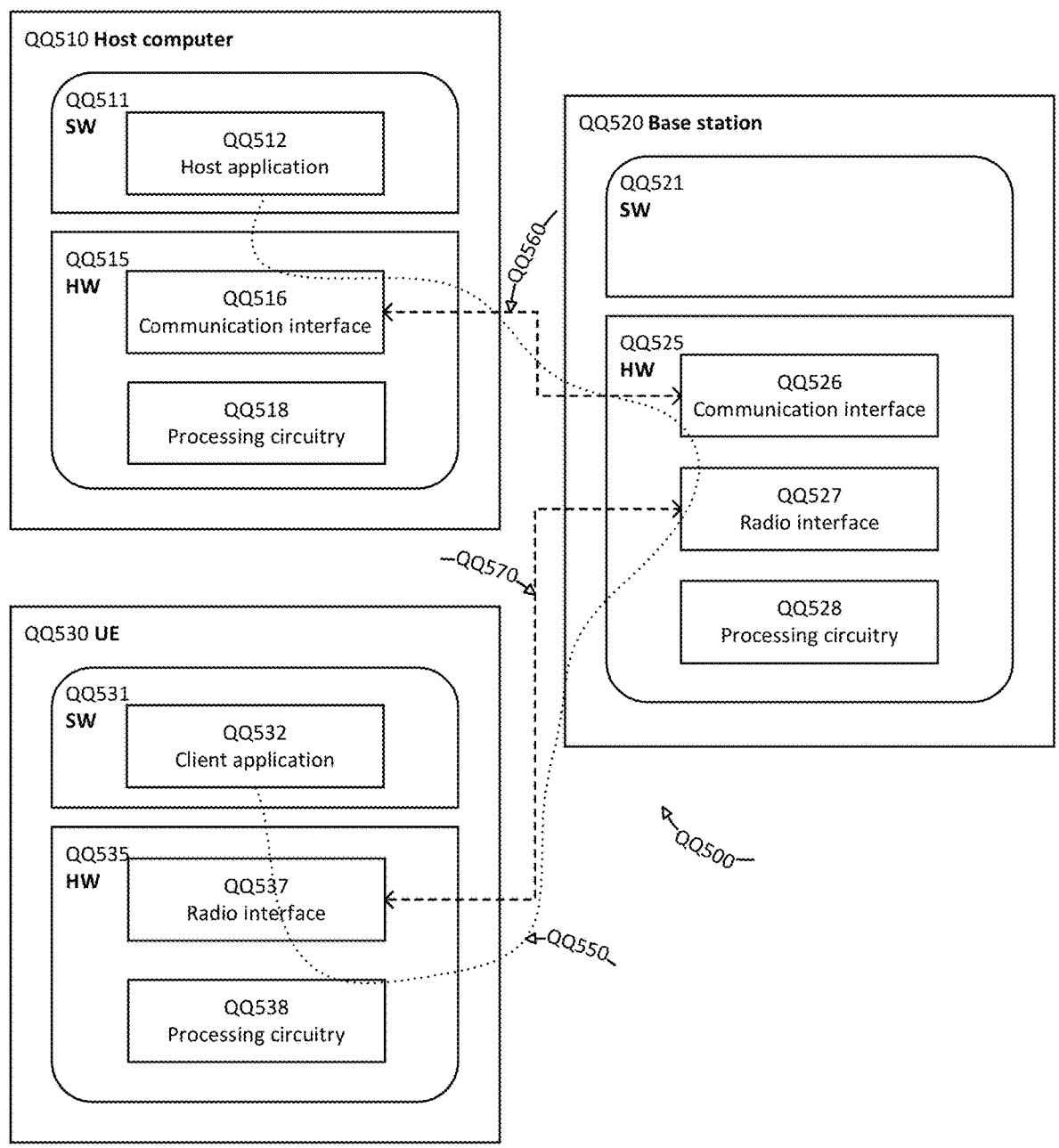

It is noted that host computer QQ510, base station QQ520 and UE QQ530 illustrated in FIG. 19 may be similar or identical to host computer QQ430, one of base stations QQ412a, QQ412b, QQ412c and one of UEs QQ491, QQ492 of FIG. 18, respectively. This is to say, the inner workings of these entities may be as shown in FIG. 19 and independently, the surrounding network topology may be that of FIG. 18.

In FIG. 19, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may provide redundancy for uplink/downlink communications through the wireless communication network and thereby provide benefits such as improved reliability.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 20:
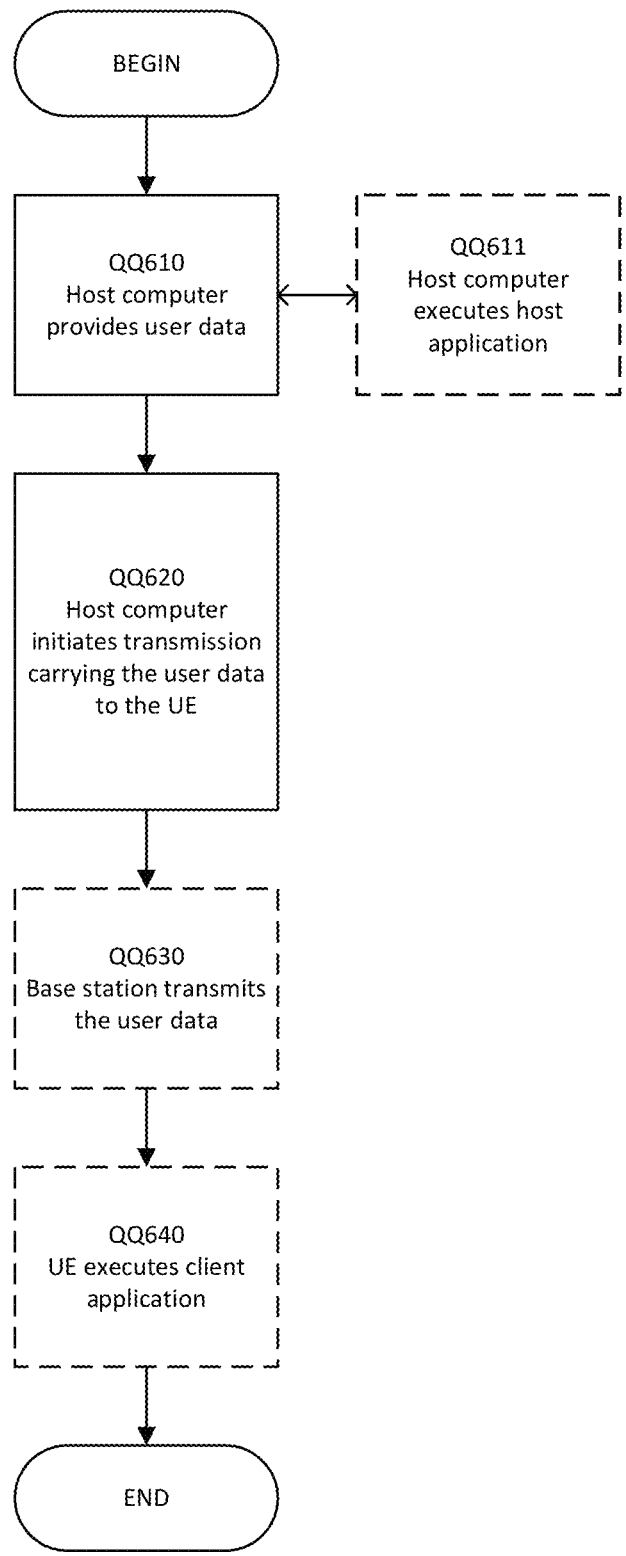

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 21:
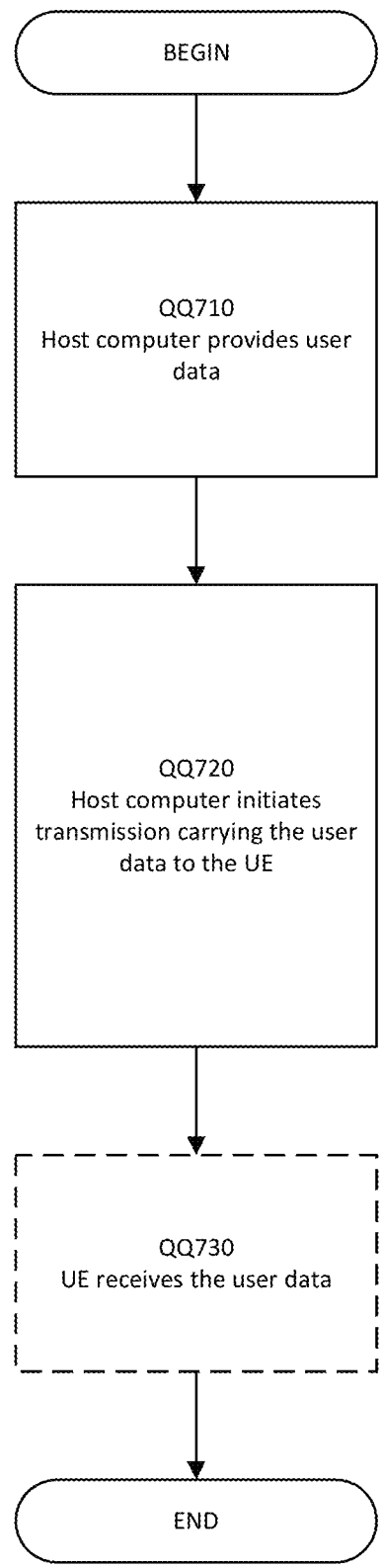

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 22:
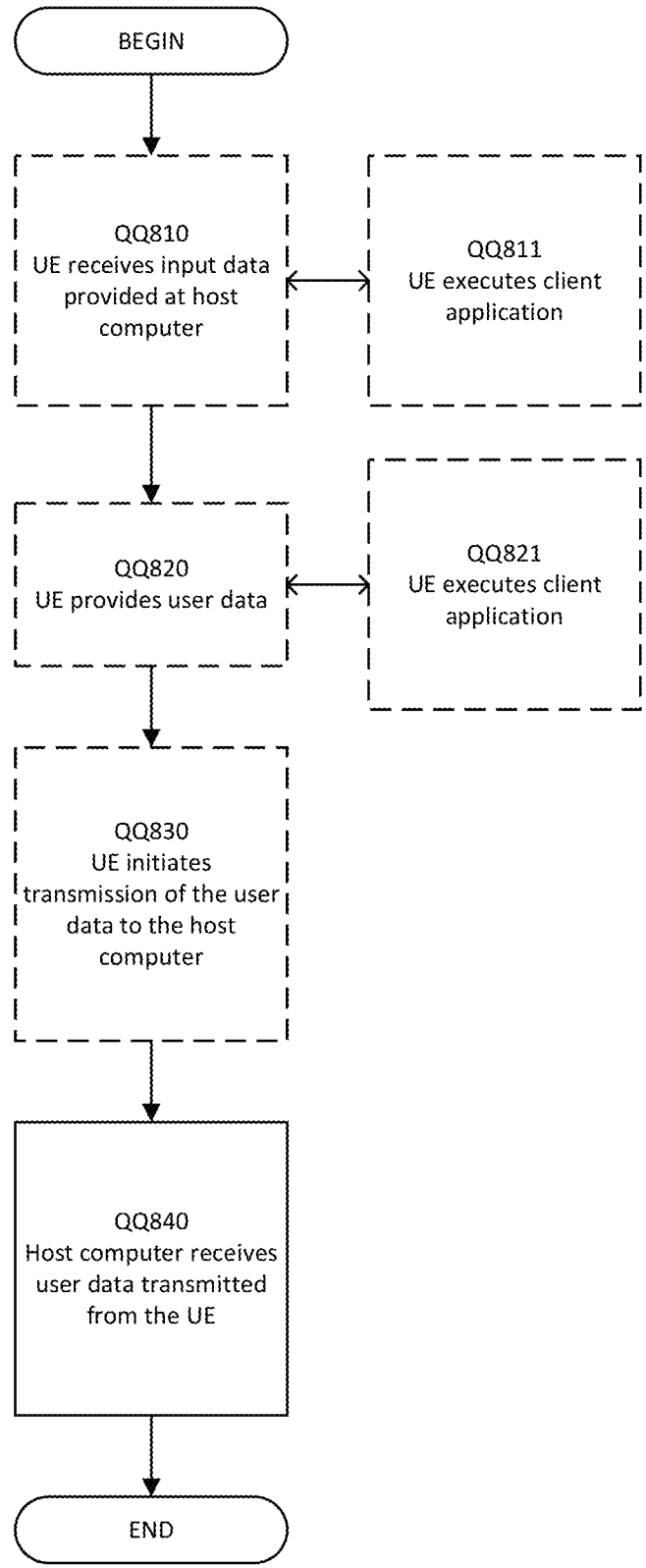

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 23:
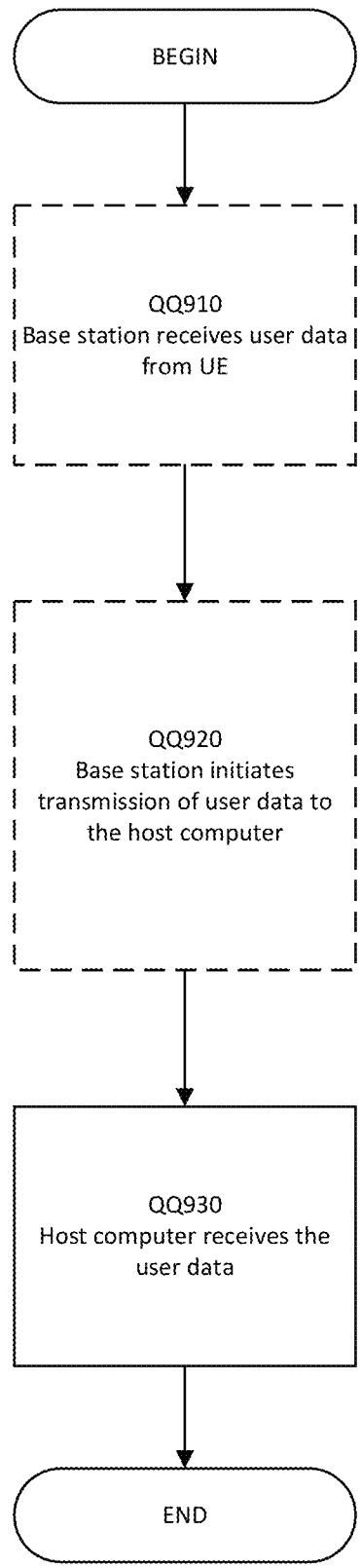

FIG. 23 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Explanations for some abbreviations and acronyms used in the present disclosure are provided below.

| Abbreviation | Explanation |
| --- | --- |
| ACL | Access Control List |
| AMF | Access and Mobility management Function |
| API | Application Programming Interface |
| ARP | Address Resolution Protocol |
| AS | Application Server |
| BC | Broadcast |
| BS | Base Station |
| BUM | Broadcast, Unknown Unicast, Multicast |
| C-MTC | Critical Machine Type Communication |
| CN | Core Network |
| DC | Dual Connectivity |
| DHCP | Dynamic Host Configuration Protocol |
| DN | Data Network |
| DNN | Data Network Name |
| DPI | Deep Packet Inspection |
| DRX | Discontinuous Reception |
| EPC | Evolved Packet Core |
| EPS | Evolved Packet System |
| gNB | NR Node B |
| GW | Gateway |
| HeNB | Home evolved Node B |
| IETF | Internet Engineering Task Force |
| IMEI | International Mobile Equipment Identity |

-continued

| Abbreviation | Explanation |
| --- | --- |
| IMSI | International Mobile Subscriber Identity |
| IMSISV | International Mobile Equipment Identifier Software Version |
| LLDP | Link Layer Discovery Protocol |
| LIPA | Local IP Access |
| LTE | Long Term Evolution |
| LGW | Local GW |
| MAC | Medium Access Control |
| MgNB | Master gNB |
| OTA | Over The Air |
| PDCP | Packet Data Convergence Protocol |
| PDU | Protocol Data Unit |
| RAN | Radio Access Network |
| RRC | Radio Resource Control |
| RSTP | Rapid Spanning Tree Protocol |
| SgNB | Secondary gNB |
| SMF | Session Management Function |
| STP | Spanning Tree Protocol |
| SUPI | Subscription Permanent Identifier |
| SW | Switch |
| TSN | Time-Sensitive Networking |
| UDM | User Data Management |
| UDR | User Data Repository |
| UE | User Equipment |
| UPF | User Plane Function |
| VLAN | Virtual Local Area Network |

Various references discussed in the present disclosure are identified below.
  Reference [1] IEEE 802.1, Time-Sensitive Networking (TSN) Task Group, http://www.ieee802.org/1/pages/tsn.html, last modified 3 May 2017
  Reference [2] IETF Deterministic Networking (DetNet) Working Group, v6.69.0, https://datatracker.ietf.org/wg/detnet/about/
  Reference [3] 3GPP TS 23.501, v15.0.0, 2017-12, System Architecture for the 5G System; Stage 2 (Release 15)
  Reference [4] 3GPP TS 23.502, v15.0.0, 2017-12, Procedures for the 5G System; Stage 2 (Release 15);
  Reference [5] 3GPP TS 23.401, v15.0.0, 2017-12, General Packet Radio Service (GPRS) enhancements for Evolved Universal Terrestrial Radio Access Network (E-UTRAN) access (Release 15);
  Reference [6] International Publication No. WO/2012/137044 to Miklos et al. entitled "Ethernet Based Local IP Access";
  Reference [7] 3GPP TS 24.301, v15.1.1, 2018-01, Non-Access-Stratum (NAS) protocol for Evolved Packet System (EPS), Stage 3 (Release 15);
  Reference [8] 3GPP TR 24.890, v15.0.0, 2017-12, 5G System—Phase 1; CT WG1 Aspects (Release 15).
  Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a core network, CN, entity of a wireless communication network, the method comprising:
receiving a session establishment request from a wireless terminal with a delay sensitive traffic in a connected mode through a base station node;
responsive to receiving the session establishment request, determining that a breakout protocol data unit, PDU, session is to be established for the wireless terminal, so as to keep the wireless terminal with the delay sensitive traffic in the connected mode and to avoid transition of the wireless terminal with the delay sensitive traffic to an idle mode; and
responsive to determining that the breakout PDU session is to be established for the wireless terminal, transmitting a request to the base station node, wherein the request includes an indication that the breakout PDU session is to be established for the wireless terminal by providing that the base station node is directly connected to a local area network in a user plane for the breakout PDU session for the wireless terminal.

2. The method of claim 1, wherein the request further includes a user plane address for the wireless terminal.

3. The method of claim 2, wherein the session establishment request includes the user plane address.

4. The method of claim 2, wherein the user plane address is based on at least one of a medium access control, MAC, address for the wireless terminal and/or an internet protocol, IP, address for the wireless terminal.

5. The method of claim 2, wherein the user plane address for the wireless terminal is included in an Access Control List, ACL, that is provided in the request.

6. The method of claim 1, wherein the session establishment request includes an indication to request the breakout PDU session, and wherein determining that the PDU session is to be established comprises determining that the PDU session should be established based on the indication from the session establishment request.

7. The method of claim 1, wherein determining that the PDU session is to be established comprises determining that the PDU session is to be established based on at least one of an identity of the wireless terminal and/or an identity of the base station node.

8. The method of claim 1, wherein the breakout PDU session is at least one of an Ethernet breakout PDU session and/or an internet protocol, IP, breakout PDU session.

9. The method of claim 1, wherein the breakout PDU session is to be established for the wireless terminal by providing that the base station node is directly connected to the local area network in the user plane for the breakout PDU session for the wireless terminal via an interface without any core network user plane entities in a path of the user plane between the base station node and the local area network.

10. A method of operating a base station node of a wireless communication network, the method comprising:
receiving a request from a core network, CN, entity of the wireless communication network, wherein the request includes an indication that that a breakout protocol data unit, PDU session is to be established for a wireless terminal with a delay sensitive traffic in a connected mode and a user plane address for the breakout PDU session for the wireless terminal;
establishing the breakout PDU session for the wireless terminal responsive to the request using the user plane address, so as to keep the wireless terminal with the delay sensitive traffic in the connected mode and to avoid transition of the wireless terminal with the delay sensitive traffic to an idle mode, wherein the breakout PDU session is established for the wireless terminal by providing that the base station node is directly connected to a local area network in a user plane for the breakout PDU session for the wireless terminal;
receiving a downlink packet at the base station node over the local area network using the breakout PDU session with the base station node directly connected to the local area network in the user plane, wherein the downlink packet includes the user plane address; and
responsive to the user plane address of the downlink packet matching the user plane address for the breakout PDU session for the wireless terminal, transmitting the downlink packet over a radio interface to the wireless terminal in accordance with the breakout PDU session.

11. The method of claim 10, wherein the breakout PDU session is established for the wireless terminal by providing that the base station node is directly connected to the local network in the user plane for the breakout PDU session for the wireless terminal via an interface without any core network user plane entities in a path of the user plane between the base station node and the local network.

12. The method of claim 10, wherein the user plane address for the wireless terminal is based on at least one of a medium access control, MAC, address for the wireless terminal and/or an internet protocol, IP, address for the wireless terminal.

13. The method of claim 10, wherein the breakout PDU session is an Ethernet breakout PDU session, and wherein the user plane address for the wireless terminal is a medium access control, MAC, address for the wireless terminal.

14. The method of claim 10, wherein the breakout PDU session is an internet protocol, IP, breakout PDU session, and wherein the user plane address for the wireless terminal is an IP address for the wireless terminal.

15. The method of claim 10, wherein the user plane address for the wireless terminal is included in an Access Control List, ACL.

16. The method of claim 10 further comprising:
responsive to detecting movement of the wireless terminal to the base station node from another base station node, initiating transmission of an update packet to a plurality of nodes of the local area network, wherein the update packet includes the user plane address for the wireless terminal.

17. The method of claim 10 further comprising:
responsive to receiving an update packet from the wireless terminal over the radio interface, initiating transmission of the update packet to a plurality of nodes of the local area network, wherein the update packet includes the user plane address for the wireless terminal.

18. The method of claim 10, further comprising:
initiating transmission of a notification to a central controller, wherein the notification includes the user plane address of the wireless terminal and an identity of the base station node.

19. A core network, CN, entity comprising:
a network interface configured to provide communication with other nodes of a communication network; and
a processor coupled with the network interface, wherein the processor is configured to:
receive a session establishment request from a wireless terminal with a delay sensitive traffic in a connected mode through a base station node and through the network interface;
determine that a breakout protocol data unit, PDU, session is to be established for the wireless terminal responsive to receiving the session establishment request, so as to keep the wireless terminal with the delay sensitive traffic in the connected mode and to avoid transition of the wireless terminal with the delay sensitive traffic to an idle mode; and
transmit a request through the network interface to the base station node responsive to determining that the breakout PDU session is to be established for the wireless terminal, wherein the request includes an indication that the breakout PDU session is to be established for the wireless terminal by providing that the base station node is directly connected to a local area network in a user plane for the breakout PDU session for the wireless terminal.

20. A base station node comprising:
a transceiver configured to provide communication over a wireless interface with a plurality of wireless terminals;
a network interface configured to provide communication with other nodes of a communication network; and
a processor coupled with the transceiver and the network interface, wherein the processor is configured to:
receive a request through the network interface from a core network, CN, entity of a wireless communication network, wherein the request includes an indication that that a breakout protocol data unit, PDU, session is to be established for a wireless terminal with a delay sensitive traffic in a connected mode and a user plane address for the breakout PDU session for the wireless terminal;
establish the breakout PDU session for the wireless terminal responsive to the request using the user plane address, so as to keep the wireless terminal with the delay sensitive traffic in the connected mode and to avoid transition of the wireless terminal with the delay sensitive traffic to an idle mode, wherein the breakout PDU session is established for the wireless terminal by providing that the base station node is directly connected to a local area network in a user plane for the breakout PDU session for the wireless terminal;
receive a downlink packet at the base station node through the network interface over the local area network using the breakout PDU session with the base station node directly connected to the local area network in the user plane, wherein the downlink packet includes the user plane address; and
transmit the downlink packet through the transceiver over a radio interface to the wireless terminal in accordance with the breakout PDU session responsive to the user plane address of the downlink packet matching the user plane address for the breakout PDU session for the wireless terminal.

\* \* \* \* \*